(12) United States Patent
Shirai et al.

(10) Patent No.: US 6,637,948 B2
(45) Date of Patent: Oct. 28, 2003

(54) RECEPTACLE MODULE

(75) Inventors: Takehiro Shirai, Chiba (JP); Masayuki Iwase, Chiba (JP)

(73) Assignee: The Furukawa Electric Co., Ltd., Tokyo (JP)

(*) Notice: Subject to any disclaimer, the term of this patent is extended or adjusted under 35 U.S.C. 154(b) by 195 days.

(21) Appl. No.: 09/828,614

(22) Filed: Apr. 6, 2001

(65) Prior Publication Data
US 2001/0028772 A1 Oct. 11, 2001

(30) Foreign Application Priority Data
Apr. 7, 2000 (JP) .......................... 2000-111933

(51) Int. Cl.[7] ................................. G02B 6/36
(52) U.S. Cl. ............................. 385/92; 385/59
(58) Field of Search ............... 385/92, 58–60, 385/62, 70–72, 81, 88–89

(56) References Cited

U.S. PATENT DOCUMENTS 6,102,581 A * 8/2000 Deveau et al. ............... 385/56
6,146,023 A * 11/2000 Weigel ......................... 385/55

FOREIGN PATENT DOCUMENTS

JP 11-202166 7/1999

OTHER PUBLICATIONS

Co-pending Application Ser. No. 09/616,706 filed Jul. 14, 2000 (Minamino et al.).

* cited by examiner

Primary Examiner—Khiem Nguyen
(74) Attorney, Agent, or Firm—Knobbe Martens Olsen & Bear LLP

(57) ABSTRACT

A receptacle module capable of suppressing deterioration of characteristics of optical signals transmitted in optical fiber cables even when an external force is applied in a direction orthogonal to a longitudinal direction in a state where an optical fiber connector is attached in a receptacle. The reception module is provided with a receptacle having a first sleeve for holding in a detachable manner an optical fiber connector provided at end of an optical fiber cable, a second sleeve, and a window communicating the first and second sleeves and with an optical module held and fixed in the second sleeve. A projection of the optical module passes over the window to be positioned in the first sleeve and moves a ferrule a bit to press a spring when the connector is inserted in the first sleeve. The ferrule is moved to the right against the pushing force of the spring 21a. The abutting force increases the connection load between the optical fiber cables.

11 Claims, 18 Drawing Sheets

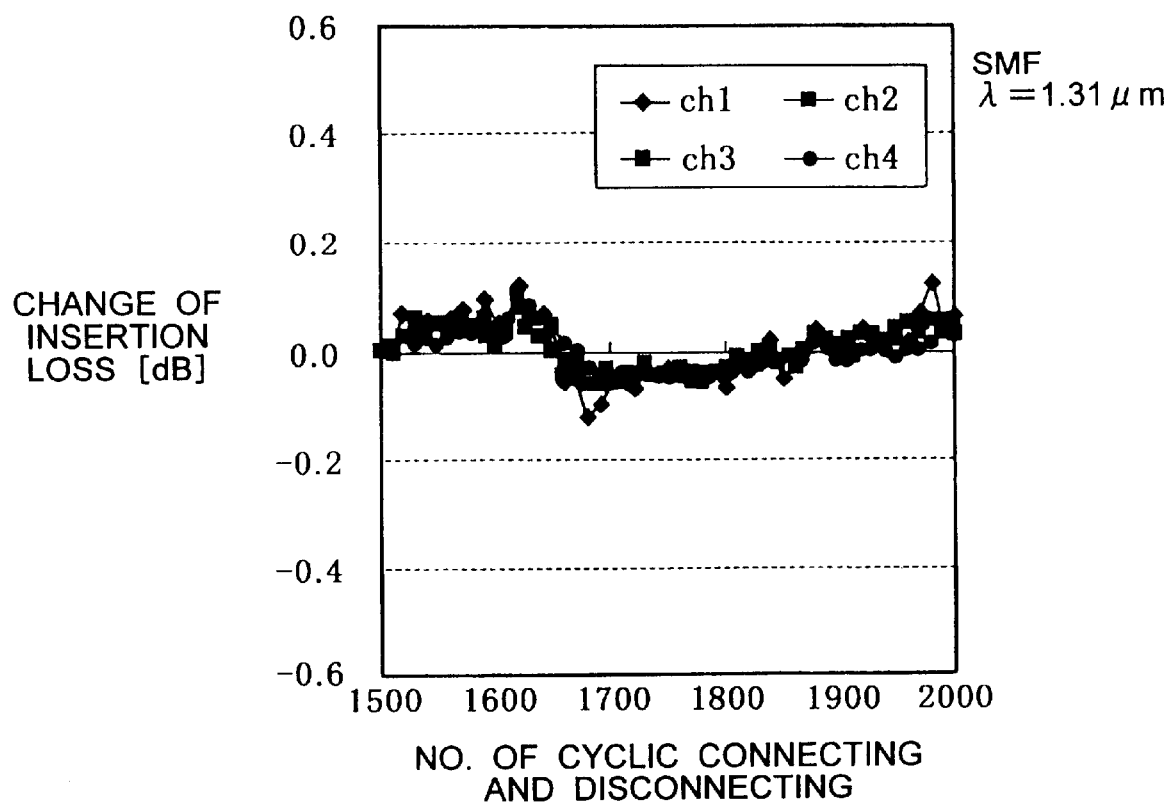

$L1a = L2a$

RECEPTACLE MODULE

BACKGROUND OF THE INVENTION

1. Field of the Invention

The present invention relates to a receptacle module for connecting optical fiber cables.

Specifically, the present invention relates to a receptacle module into which an optical module provided with a light emitting element and/or a light receiving element is fixed by insertion and to a receptacle module into which an optical fiber connector is inserted to optically connect an optical fiber cable of an optical module and an optical fiber cable of the optical fiber connector.

2. Description of the Related Art

Known in the art is an optical fiber connection assembly obtained by positioning two optical fiber connectors to face each other and causing the end faces of the optical fiber cables to come into facial contact.

An example of such an optical fiber connection assembly will be explained with reference to FIG. 1. The optical fiber connection assembly illustrated in FIG. 1 is comprised of an adapter 2 and optical fiber connectors 1a and 1b as examples of MT-RJ connectors. The optical fiber connectors 1a and 1b are engaged by using the adapter 2 to bring the end faces of optical fiber cables 30a and 30b passing through these optical fiber connector 1a and 1b into facial contact with each other and thereby optically connect the optical fiber cables 30a and 30b.

The optical fiber cable 30a, as illustrated in FIG. 3B, is provided with a plurality of, for example, four, optical fibers. FIG. 1 illustrates only one optical fiber among them.

The adapter 2 has a first (left side) sleeve 10a for receiving the optical fiber connector 1a and a second (right side) sleeve 10b for receiving the optical fiber connector 1b. The first sleeve 10a and the second sleeve 10b are formed integrally. The adapter 2 is formed is with a window 10c with an opening for communicating the two sleeves 10a and 10b. A right front end of a left side ferrule 22a explained later and a left front end of a right side ferrule 22b are inserted into the opening of the window 10c so as to achieve stable positioning of the end faces of the optical fiber cables exposed at the end faces of these ferrules 22a and 22b at the position of this window 10c.

An engagement use opening 10a1 extending from the inside to the outside of the sleeve 10a is formed in the wall of the sleeve 10a. When a latch 20a1 of a housing 20a is inserted in the engagement use opening 10a1, the optical fiber connector 1a held in the sleeve 10a is fixed in place.

The optical fiber connector 1a partially inserted in the inside space of the first sleeve 10a has the housing 20a, a spring 21a, and the ferrule 22a.

The housing 20a is shaped as a hollow cylinder with a bottom. The spring 21a and part of the ferrule 22a are contained in the hollow cylinder of the housing 20a. The latch 20a1 and a guard shaped pressing portion 20a2 are provided on the outer wall of the housing 20a along an axial direction.

The ferrule 22a is comprised of a middle large area part and small area parts on its two sides. The left small area part and the middle large area part are contained in the hollow cylinder of the housing 20a, but the right small area part is passes through the opening of the housing 20a and is inserted into the opening of the window 10c.

The ferrule 22a is pressed to the right side by the spring 21a contained in the inside space of the housing 20a, but the middle large area part abuts against the opening of the housing 20a and stops it there. Conversely, when a leftward pressing force is added to the right small area part, the ferrule 22a moves to the left side, but stops at a position balanced with the force of the spring 21a.

The optical fiber cable 30a passes through the inside of the housing 20a and is exposed at the end face of the right small area part of the ferrule 22a. The other optical fiber cable 30b also posses through the inside of the housing 20b and is exposed at the end face of the left small area part of the ferrule 22b.

The optical fiber connector 1b is structured the same as the optical fiber connector 1a.

The end face of the right small area part of the ferrule 22a of the optical fiber connector 1a and the end face of the left small area part of the ferrule 22b of the optical fiber connector 1b are polished to a fiber protrusion so that they may be accurately physical connected. For example, a diameter of the mode field of the single mode optical fiber is about 10 $\mu$m. Therefore, it is necessary to very precisely process these end faces so as to prevent deterioration in the resistance to insertion loss and other various characteristics when connecting these optical fiber cables.

When the housing 20a is pushed into the sleeve 10a until the guard shape pressing portion 20a2 abuts against the front end of the sleeve 10a and the latch 20a1 is fits in the engagement use opening 10a1 of the sleeve 10a, the optical fiber connector 1a is inserted in the sleeve 10a.

The optical fiber connector 1b is similarly inserted in the sleeve 10b.

At this time, the right end face of the ferrule 22a and the left end face of the ferrule 22b abut against each other at an optical reference plane 40 at the substantial center of the window 10c. Due to this connection, the spring 21a contained in the inside space of the housing 20a and the spring 21b contained in the inside space of the housing 20b are compressed. The spring 21a and the spring 21b are manufactured to substantially same characteristics and uniformly press against the end faces of the ferrule 22a and the ferrule 22b which they abut against so as to maintain the connection of the right end face of the ferrule 22a and the left end face of the ferrule 22b.

The right end face of the ferrule 22a and the front end of the optical fiber cable 30a exposed there are polished to a fiber protrusion. Similarly, the left end face of the ferrule 22b and the front end of the optical fiber cable 30b exposed there are polished to a fiber protrusion. Therefore, when the right end face of the ferrule 22a and the left end face of the ferrule 22b are connected, the end face of the optical fiber cable 30a and the end face of the optical fiber cable 30b directly contact each other and therefore the optical fiber cable 30a and the optical fiber cable 30b are optically connected.

The connection load (stress) of the connecting part of the optical fiber cables 30a and 30b is defined by certain standards, for example, the Japan Industrial Standard (JIS standard). For example, in the case of a fiber transmission system optical fiber connector (FC) and a single fiber coupling connector (SC), it is prescribed that the load be 7.8 to 11.8N, while in the case of a multiple fiber push on connector (MPO), it is prescribed that the load be 6.8 to 11.8N.

In addition to optical fiber connection assemblies connecting optical fiber connectors 1a and 1b explained with reference to FIG. 1, direct connection of the optical module fixed in the receptacle and the optical fiber connector has been demanded. The principle is basically the same as the optical fiber connection assembly explained with reference to FIG. 1.

The combination of a receptacle and optical module is referred to as a "receptacle module" in the present specification.

A novel structure of a receptacle module enabling stable optical connection of the optical fiber cable of an optical fiber connector and the optical fiber cable of an optical module is being sought. The connection load for connection with an optical fiber cable in an optical module when inserting an MT-RJ connector in a receptacle module has not yet been stipulated, but a connection load of 7.8 to 11.8N is being considered.

SUMMARY OF THE INVENTION

An object of the present invention is to provide a receptacle module of a novel structure enabling stable optical connection between an optical fiber cable of an optical fiber connector and an optical fiber cable of an optical module.

Another object of the present invention is to provide a receptacle module substantially free of deviation of optical positions of optically connected optical fiber cables and with little deterioration of characteristics of optical signals transmitted through the optical fiber cables even when an external force, vibration, or the like is applied to the receptacle module in a direction orthogonal to the axial direction in a state where the optical fiber connector is attached in the receptacle of the receptacle module.

According to a first aspect of the present invention, there is provided a receptacle module having a receptacle having first and second sleeves formed at positions facing each other in an axial direction by way of a window and an optical module provided with at least one of a light receiving element and/or a light emitting element and a first optical fiber and having a projection for insertion through the window and a body for insertion into the second sleeve, the first optical fiber being exposed at an end face of the projection, wherein a length of the projection is formed to be substantially at least a length of the window in the axial direction, the end face of the projection positioned at an end face of the window at the first sleeve side or is positioned inside the first sleeve when the body of the optical module is fully inserted into the second sleeve, and the first sleeve receives an optical fiber connector having an the end face at which is exposed a second optical fiber is exposed for optical connection with the first optical fiber.

Preferably, the surface of the first optical fiber exposed at the end face of the projection of the optical module is polished so as to connect with the second optical fiber by physical contact.

More preferably, a connection load of at least 1.09 times the standard value of the connection load when optically connect two optical fiber connectors is applied to a connecting part of the first optical fiber and the second optical fiber when the optical fiber connector is inserted in the first sleeve.

Still more preferably, a connection load of at least 8.5N is applied.

Preferably, the optical fiber connector is one having a ferrule through which the second optical fiber passes and is exposed at its end face, a housing holding the ferrule to be able to move in the axial direction, and a spring for pushing the ferrule in the housing toward the inside of the first sleeve.

More preferably, the optical fiber connector is selected from an MT-RJ, MPO, SC, FC and MPX connectors.

Preferably, the ferrule of the optical fiber connector is moved at least 0.5 mm at the end face of the projection of the optical module when the optical fiber connector is inserted in the first sleeve.

According to a second aspect of the present invention, there is provided an optical fiber connection assembly having a receptacle having first and second sleeves formed at positions facing each other in an axial direction by way of a window; an optical module provided with at least one of a light receiving element and/or a light emitting element and a first optical fiber and having a projection for insertion through the window and a body for insertion into the second sleeve, the first optical fiber being exposed at an end face of the projection; and an optical fiber connector having a ferrule through which a second optical fiber cable passes and is exposed at its end face, a housing holding the ferrule to be able to move in the axial direction, and a spring for pushing the ferrule in the housing toward the inside of the first sleeve; wherein a length of the projection is formed to be substantially at least a length of the window in the axial direction; the end face of the projection positioned at an end face of the window at the first sleeve side or is positioned inside the first sleeve when the body of the optical module is fully inserted into the second sleeve; and the end faces of the first optical fiber and the second optical fiber are optically connected by a connection load of at least 1.09 times the standard value of the connection load when optically connect two optical fiber connectors when the optical fiber connector is inserted in the first sleeve.

According to a third aspect of the present invention, there is provided a receptacle module comprising a receptacle having first and second sleeves spatially connected with each other and an optical module provided with at least one of a light receiving element and a light emitting element and an optical fiber, the optical fiber being exposed at an end face of the optical module and the optical module being fixed in the first sleeve of the receptacle; wherein the second sleeve of the receptacle receiving an optical fiber connector, an optical fiber being exposed at an end face of the optical fiber connector; and the optical module and the optical fiber connector being fixed with a load of at least 8.5N at their end faces.

According to a fourth aspect of the present invention, there is provided a receptacle module comprising a receptacle having first and second sleeves spatially connected with each other and an optical module provided with at least one of a light receiving element and a light emitting element and an optical fiber, the optical fiber being exposed at an end face of the optical module and the optical module being fixed in the first sleeve of the receptacle; wherein the second sleeve of the receptacle receiving an optical fiber connector, an optical fiber cable being exposed at an end face of the optical fiber connector; and the optical module and the optical fiber connector being fixed with a load of at least 1.09 times the lower limit of the standard load for connection of two optical fiber connectors.

According to a fifth aspect of the present invention, there is provided a method for selecting a connection load applied to a connecting part of an optical module and an optical fiber connector having optical connectors to connect each other by physical contact, comprising: the connection load is selected as a value of at least 1.09 times the standard minimum value of the connection load when optically connect two optical fiber connectors.

BRIEF DESCRIPTION OF THE DRAWINGS

These and other objects and features of the present invention will be more apparent from the following description given with reference to the accompanying drawings, wherein:

FIG. 7A is a graph of the relationship between the amount of movement of the ferrule and connection load, while

FIG. 11 is a graph of the change of the insertion loss in 4 ch optical fibers when using optical fiber cables of the optical fiber connector and optical module illustrated in FIGS. 4C to 4D of the SMF type and GIF type, setting the wavelength λ of the optical signal to be transmitted at 1.31 μm, and repeatedly connecting and disconnecting the optical fiber connector to and from the receptacle;

FIG. 14A is a graph of the connecting and disconnecting characteristics relating to the optical output of the laser diode shown in FIG. 5, while

DESCRIPTION OF THE PREFERRED EMBODIMENTS

First Embodiment

First, a receptacle module according to a first embodiment of the present invention and an optical fiber connection assembly will be explained by referring to FIG. 2.

Figure 2:
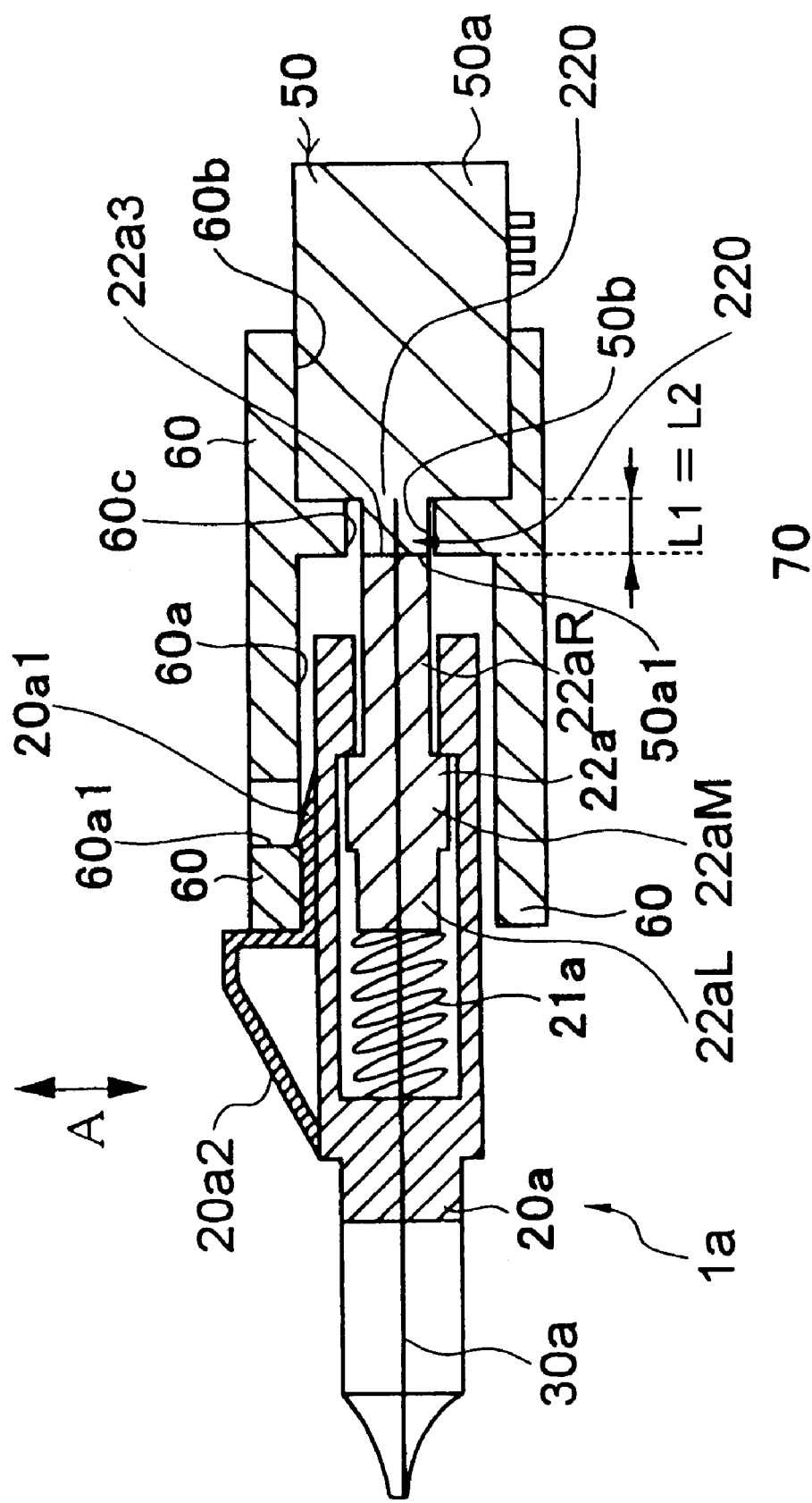
FIG. 2 is a schematic sectional view of a receptacle module in a longitudinal (axial) direction when connecting an optical fiber cable of an optical fiber connector and an optical fiber cable of an optical module by a receptacle in a first embodiment of the present invention.

FIG. 2 is a sectional view of a receptacle module according to the first embodiment of the present invention.

In the present invention, the combination of a receptacle and an optical module is referred to as a "receptacle module" while the combination of the receptacle module with optical fiber connectors connected to connect the optical fibers is referred to as an "optical fiber connection assembly".

The receptacle module of the first embodiment illustrated in FIG. 2 is a combination of a receptacle 60 and an optical module 50. The receptacle module of the first embodiment is designed for insertion of an optical fiber connector 1a for optical connection of the optical fibers of the optical fiber connector and the optical module.

The optical fiber connector 1a is substantially the same as that explained with reference to FIG. 1.

The receptacle 60 has a first (left side) sleeve 60a for receiving the optical fiber connector 1a at a left side of the figure and a second (right side) sleeve 60b for receiving the optical module 50 in a fixed state. The first sleeve 60a and the second sleeve 60b are formed integrally. A window 60c is formed between them.

The optical module 50 is comprised of a body 50a and a projection 50b. The body 50a contains a laser diode or other light emitting element and/or a photo diode or other light receiving element and an amplification circuit and other electronic circuits. The projection 50b is inserted into the opening of the window 60c. Its end face extends up to the end face of the window 60c at the first sleeve 60a side.

In the first embodiment, the length (width) L1 of the window 60c and the length L2 of the projection 50b are equal. The lengths L1 and L2 are for example 0.5 mm. The end face of the projection 50b and the left side end face of the window 60c are in register. The part where they abut against the right end face of the ferrule 22a defines a reference plane 70.

Inside the projection 50b is inserted an optical fiber 220 extending up to the end face for optical connection to the optical fiber cable 30a of the optical fiber connector 1a. The end face of the projection 50b and the optical fiber 220 exposed there are polished to a fiber protrusion.

The body 50a of the optical module 50 is inserted into the second sleeve 60b until the surface of the body 50a where the projection 50b is formed abuts against the right end face of the window 60c. The abutting of the surface where the projection 50b is formed with the right end face of the window 60c enables precise positioning of the front end of the projection 50b in the receptacle 60.

The receptacle 60 and the optical module 50 are normally used fixed to other members or portions.

The first sleeve 60a of the receptacle 60 is formed with an engagement opening 60a1 communicating the inside with the outside.

The method of insertion of the optical fiber connector 1a into the first sleeve 60a of the receptacle 60 is similar to the method of insertion of the optical fiber connector 1a into the first sleeve 10a explained with reference to FIG. 1.

The optical module 50 is fixed by insertion to the second sleeve 60b. The end face 50a1 of the projection 50b which is to be joined with the fiber protrusion polished right end face of the ferrule 22a of the optical fiber connector 1a is positioned at the end face of the window 60c at the optical fiber connector 1a side.

The ferrule 22a is comprised of a middle large area part 22aM, a left small area part 22aL, and a right small area part 22aR. The middle large area part 22aM and the left small area part 22aL move in the space (cylinder) inside a housing 20a, so are referred to as "inside moving parts" in the present invention. The right small area part 22aR moves outside the housing 20a, so is referred to as an "outside moving part" in the present invention.

The right outside moving part 22aR of the ferrule 22a is pressed by the end face 50a1 of the projection 50b of the optical module 50. The inside moving parts (middle large area part 22aM and left small area part 22aL) of the ferrule 22a are pressed to the right side by a spring 21a contained in the space inside the housing 20a. The abutting faces of the end face of the right outside moving part 22aR of the ferrule 22a and the end face 50a1 of the projection 50b of the optical module 50 is located on the optical reference plane 70.

Figure 1:
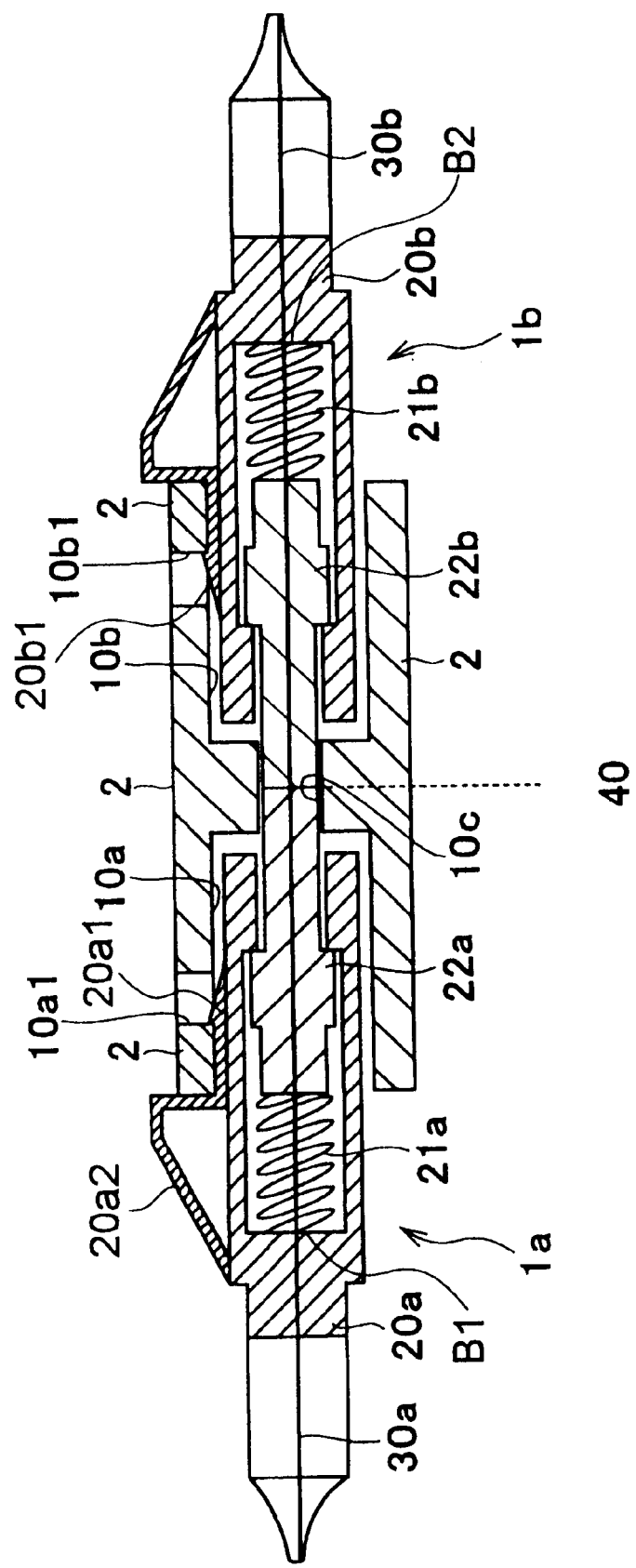
FIG. 1 is a schematic sectional view of an adapter in a longitudinal (axial) direction when using the adapter to connect two optical fiber connectors.

The connection load due to the connection at the connecting part of the end face of the outside moving part 22aR of the ferrule 22a pressed to the right side by the spring 21a and the end face 50a1 of the projection 50b of the optical module 50 is set to be the same as when connecting the ferrule 22a and ferrule 22b shown in FIG. 1. For example, in the case of FC and SC connectors, it is 7.8 to 11.8N, while in the case of MPO connectors, it is 6.8 to 11.8N. The standard value for an MT-RJ connector has not yet been determined, but here it is assumed to be the same as the case of an SC connector or a range of 7.8 to 11.8N.

Figure 7A:
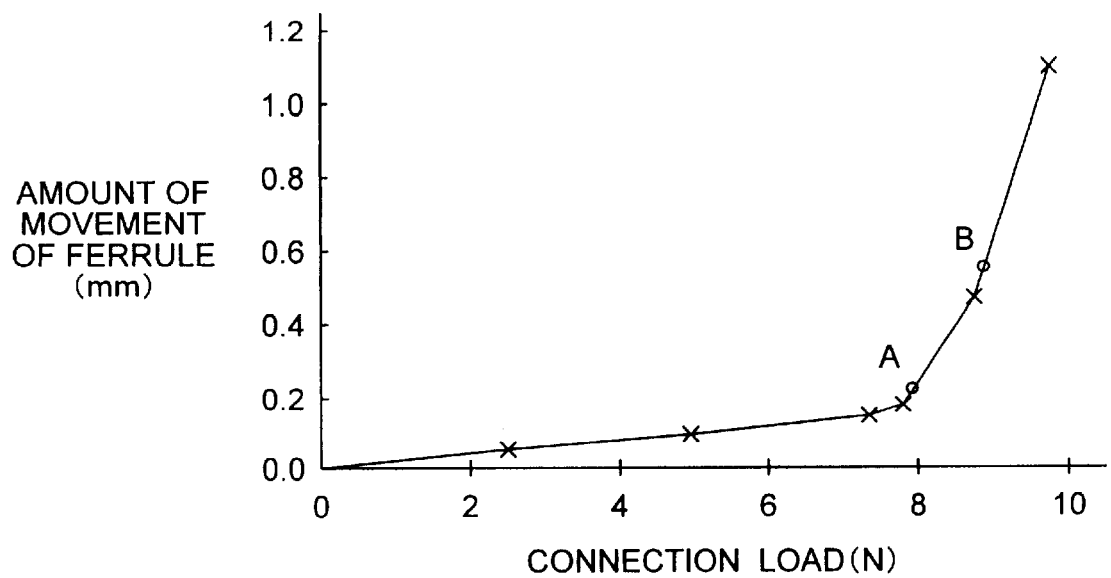

The amount of movement of the receptacle module and optical fiber connection assembly of the first embodiment illustrated in FIG. 2 is about 0.22 mm shown by the point A in FIG. 7A. The connection load at that time is about 8N or satisfying the standard.

Next, an explanation will be given of a case of occurrence of so-called side pull stress and/or vibration (sideward tensile stress and/or vibration) resulting in external force being applied to the optical fiber connection assembly in a direction orthogonal to the axial direction, for example, the direction indicated by an arrow A in FIG. 2, in a state where the optical fiber connector is attached to the adapter illustrated in FIG. 1 or a state where the optical fiber connector is attached to the receptacle illustrated in FIG. 2.

In an optical fiber connection assembly using the adapter 2 shown in FIG. 1, the optical fiber connectors are not completely fixed with respect to the receptacle and are pressed by springs, so when one of the optical fiber connectors side pull stress and/or vibration, the other can move slightly to maintain the connection between the optical fibers. Since springs 21a and 21b are inserted into both of the optical fiber connectors 1a and 1b and the two springs press against each other, the connection load is load and therefore the connecting faces seldom shift from each other and communication of optical signals is not hindered.

However, when connecting an optical fiber connector 1a to a receptacle module of the first embodiment shown in FIG. 2 where the optical module 50 and the receptacle 60 are positioned and fixed at predetermined locations, if the external force and/or vibration or the like is applied to the optical fiber connector 1a in the direction A orthogonal to the longitudinal direction, only the optical fiber connector 1a will move or vibrate in the direction in which the external force and/or vibration or the like is applied. The optical module will not move. Further, a spring 21a is only inserted in the optical fiber connector 1a. Even when the optical module 50 is connected with the receptacle by for example a spring mechanism, the two move as one part in the connected state. As a result, if the elastic force of the spring 21a contained in the housing 20a of the optical fiber connector 1a is not sufficiently strong or if a spring 21a having a performance near the lower limit of the standard for the optical fiber cable 1a is used, due to the weakness of the connecting force, positional deviation or a clearance will occur at the connecting parts of the end face of the outside moving part 22aR of the ferrule 22a and the end face 50a1 of the projection 50b of the optical module 50.

When considering such a side pull stress, a minimum load when using an MT-RJ connector of about 1.09 times the minimum 7.8N of an SC connector, that is, about 8.5N, is believed necessary. As shown by the point A of FIG. 7, the connection load of the receptacle module of FIG. 2 is about 8N. This cannot be the to be a sufficient connection load for return loss.

Second Embodiment

A receptacle module according to a second embodiment of the present invention overcoming the problem of the first embodiment and an optical fiber connection assembly using the same will be explained next by referring to FIG. 3 to FIG. 6.

Figure 3A:
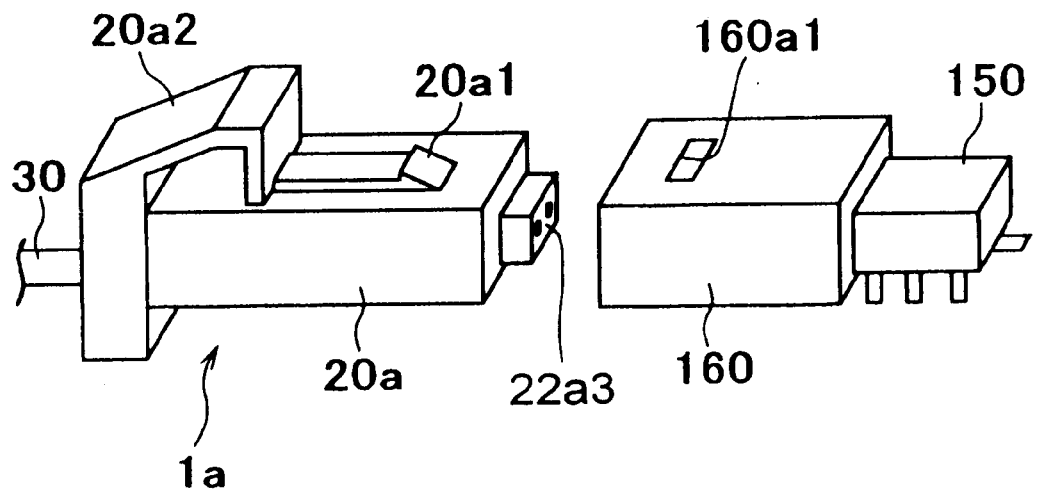
FIG. 3A is a schematic perspective view of the state before an optical fiber connector provided at an end of an optical fiber cable is attached to a receptacle in the second embodiment of the present invention.
Figure 3B:
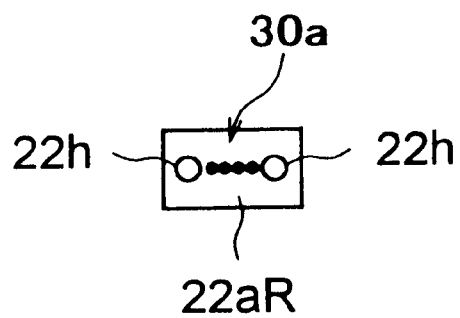
FIG. 3B is a front view of an end face of a ferrule of the optical fiber connector.
Figure 3C:
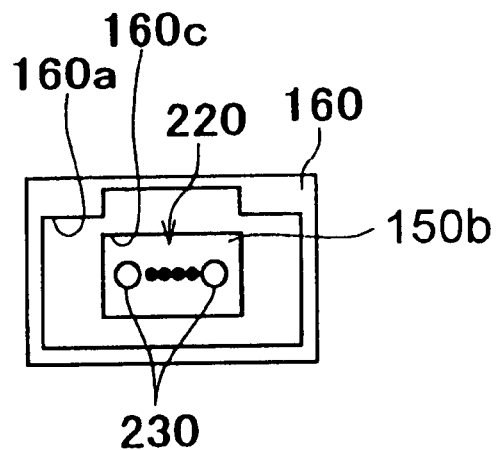
FIG. 3C is a front view of the receptacle with the optical module fixed thereto seen from the direction of attachment of the optical fiber connector.

FIG. 3A is a schematic perspective view of the state before an optical fiber connector 1a provided at an end of an optical fiber cable 30 is attached to a receptacle 160 in the second embodiment of the present invention, FIG. 3B is a front view of an outside moving part (right small area portion) 22a3 of the ferrule 22a of the optical fiber connector 1a, and FIG. 3C is a front view of the receptacle 160 with the optical module 150 fixed thereto seen from the direction of attachment of the optical fiber connector 1a.

Figure 4A:
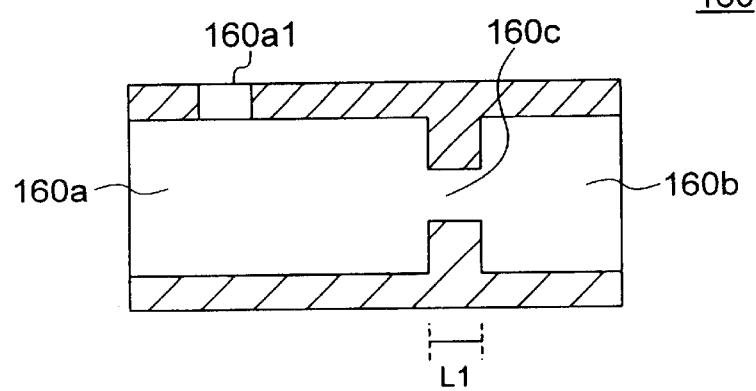
FIG. 4A is a sectional view of the receptacle of the second embodiment of the present invention.
Figure 4B:
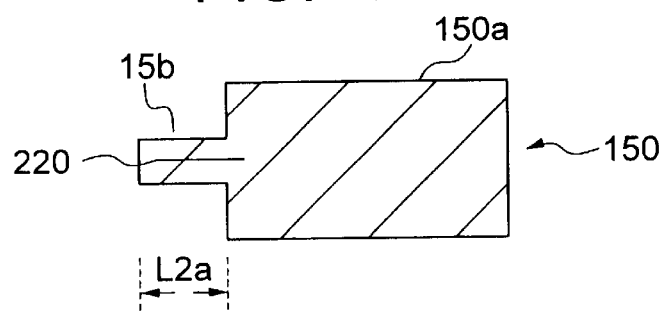
FIG. 4B is a sectional view of the optical module of the second embodiment of the present invention.
Figure 4C:
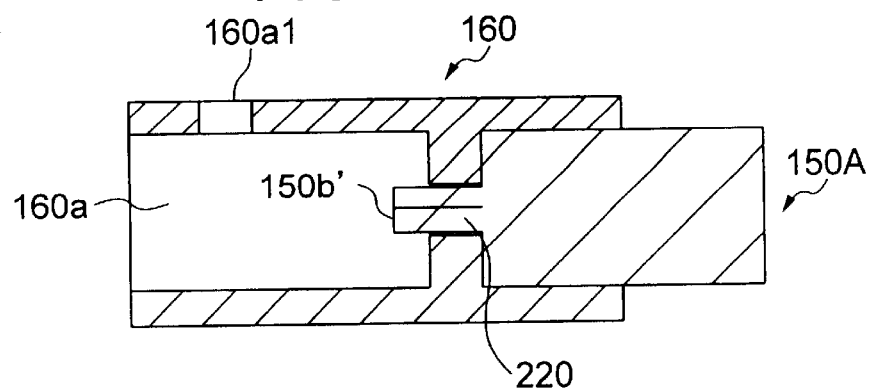
FIG. 4C is a view of the state with the optical module fixed by insertion into a first sleeve of the receptacle.
Figure 4D:
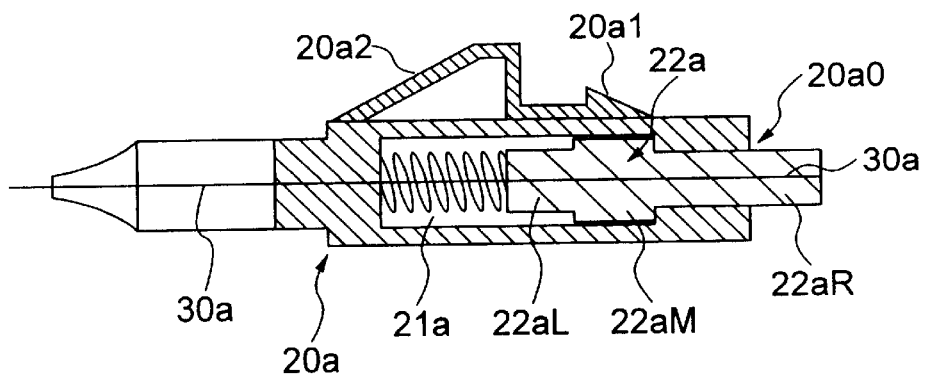
FIG. 4D is a sectional view of the optical fiber connector.

FIG. 4A is a sectional view of the receptacle 160, FIG. 4B is a sectional view of the optical module 150, FIG. 4C is a view of the state with the optical module 150 fixed by insertion into a first sleeve 160b of the receptacle 160, and FIG. 4D is a sectional view of the optical fiber connector 1a.

Figure 5:
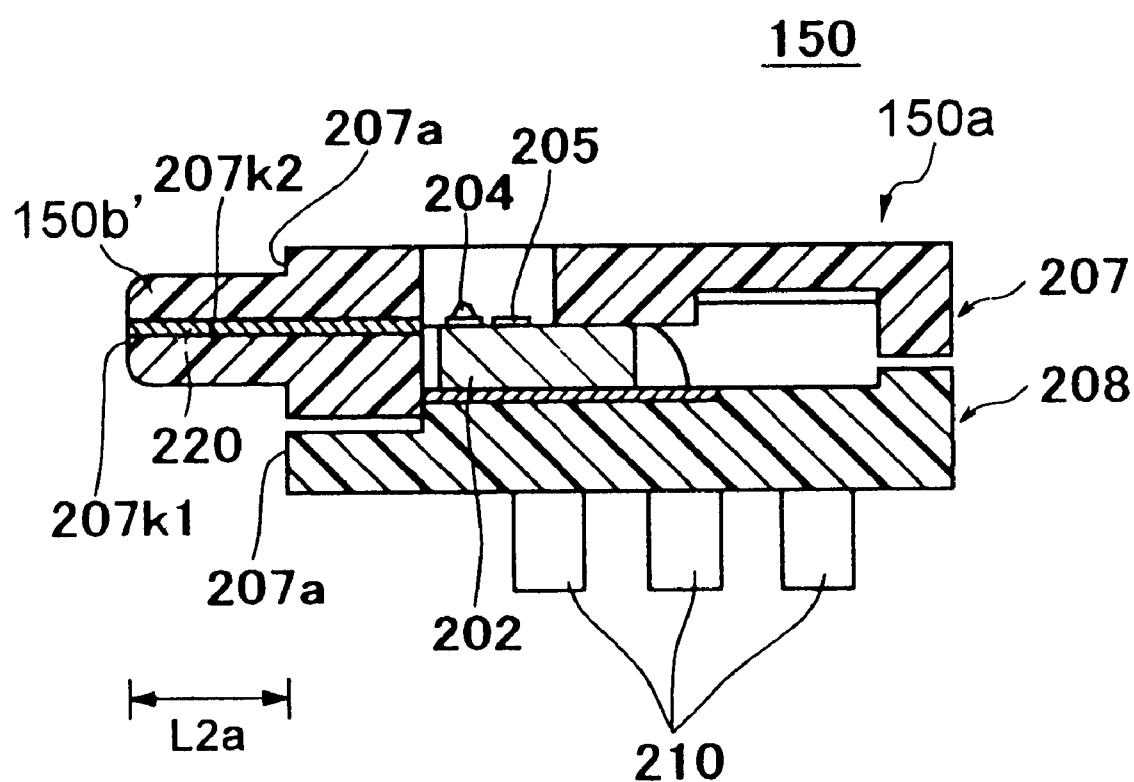
FIG. 5 is a schematic sectional view of the optical module shown in FIG. 3A and FIG. 4B.

FIG. 5 is a schematic sectional view of the optical module shown in FIG. 3A and FIG. 4B.

Figure 6:
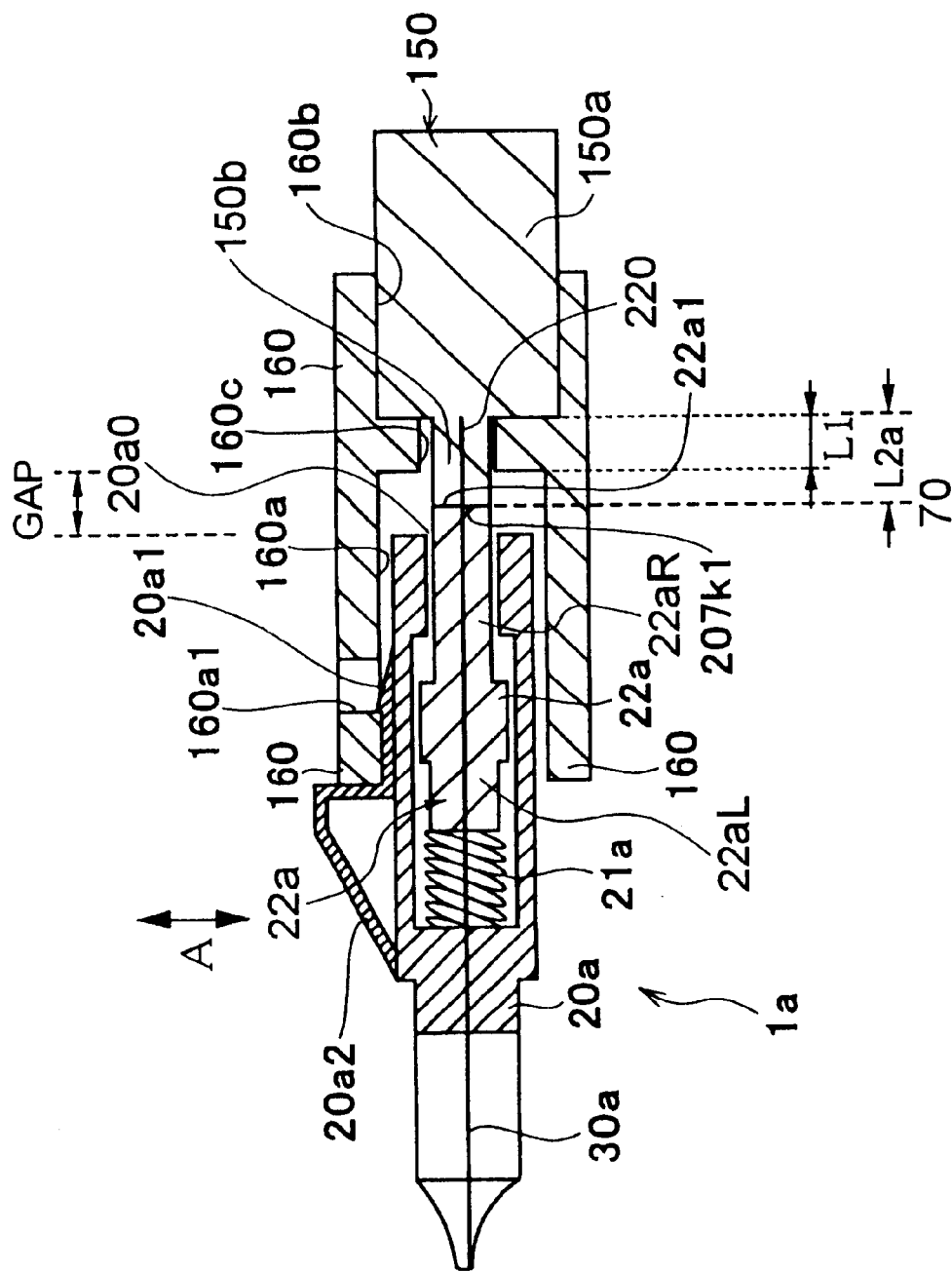
FIG. 6 is a schematic sectional view of an optical fiber connection assembly comprised of the receptacle module illustrated in FIG. 4C with the optical fiber connector inserted in it seen along the longitudinal direction.

FIG. 6 is a schematic sectional view of an optical fiber connection assembly comprised of the receptacle module illustrated in FIG. 4C with the optical fiber connector 1a inserted in it seen along the longitudinal direction.

As illustrated in FIG. 3A and FIG. 4C, the receptacle module of the second embodiment is comprised of the receptacle 160 and the optical module 150 fixed by insertion into the receptacle 160.

The optical fiber connection assembly of the second embodiment, as illustrated in FIG. 6, is comprised of the receptacle module and the optical fiber connector 1a inserted into it.

The receptacle 160 exhibits a rectangular cross section as illustrated in FIG. 3A and, as shown in FIG. 4A, has a first sleeve 160a for receiving the optical fiber connector 1a and a second sleeve 160b receiving and fixing the optical module 150. The first sleeve 160a and the second sleeve 160b are formed integrally. A window 160c is formed between the sleeves 160a and 160b along the axial line direction. An engagement use opening 160a1 is formed in the wall above the sleeve 160a.

The axial line in the present specification means the line along the center axial line of the optical fiber cable 30a inserted into the optical fiber connector 1a.

The optical module 150, as illustrated in FIG. 4B, has a body 150a and a projection 150b projecting out from the body 150a in the axial direction.

As illustrated in FIG. 3C, the end face of the projection 150b is rectangular in shape and has a cross-section of the same size as the outside moving part (small area part) 22aR of the ferrule 22a illustrated in FIG. 4D. The body 150a also has a rectangular cross-section.

As illustrated in FIG. 3C, the end face 220 of the projection 150b has two guide pin holes 230 at the both sides of the optical fiber 220 at positions matching with the positions of two guide pin holes 22h formed at the both sides of the optical fiber 30a at the end face of the outside moving part 22aR of the ferrule 32a illustrated in FIG. 3B.

The optical fiber connector 1a illustrated in FIG. 4D is an MT-RJ connector having a housing 20a, a spring 21a, and a ferrule 22a.

The housing 20a has a rectangular cross section as illustrated in FIG. 3A and, as illustrated in FIG. 4D, has a rectangular space formed with an opening 20aO at one end. The portion of the opening 20a) of the inside space of the housing 20a is formed smaller than the size of the middle large area part 22aM of the ferrule 22a.

The inside space of the housing 20a contains the spring 21a and the inside moving parts (left small area part 22aL and middle large area part 22aM) of the ferrule 22a.

The outside wall of the housing 20a is provided along the axial direction with a latch 20a1 and a guard shaped pressing part 20a2. The latch 20a1 is gently inclined in the direction of advance (right side of the figure) so as not to hinder the insertion when inserting the optical fiber connector 1a into the sleeve 160a of the receptacle 160 and has a face in the reverse direction to the direction of advance (left side of the figure) forming a right angle or sharp incline so that the optical fiber connector 1a becomes hard to detach from the sleeve 160a when the latch 20a1 is inserted engaged with the engagement use opening 160a1 of the sleeve 160a. The guard shaped pressing part 20a2 is used when connecting and disconnecting the optical fiber connector 1a to and from the receptacle 160.

The optical fiber cable 30a penetrates through the inside of the housing 20a. The optical fiber cable 30a, as shown in FIG. 3B, is provided with a plurality of, for example, four, optical fibers. FIG. 4D illustrates only one optical fiber among them.

The ferrule 22a having the rectangular cross-section is comprised of "inside moving parts" consisting of a middle large area part 22aM and a left small area part 22aL inserted in the space inside the housing 20a and moving in the inside space and a "outside moving part" 22aR consisting of a right small area part 22aR passing through the opening 20a of the housing 20a to project out from the opening 20aO and moving outside of the housing 20a.

In the example shown in FIG. 4D, the left small area part 22aL has a sectional area smaller than the middle large area part 22aM, but the shape (sectional area) of the left small area part 22aL may also be made the same shape (sectional area) as the middle large area part 22aM.

The left small area part 22aL of the ferrule 22a is pressed by the spring 21a, but the right side of the middle large area part 22aM abuts against the edges of the opening 20aO to stop there. Conversely, when the outside moving part 22aR is pressed by the projection 150b' of the optical module 150A, the ferrule 22a moves to the left side, but stops at the position balanced with the force of the spring 21a. In this way, the middle large area part 22aM of the ferrule 22a is inserted in the inside space of the housing 20a movably in the axial direction.

The optical fiber cable 30a passing through the housing 20a passes through the spring 21a and the inside of the ferrule 22a and be exposed at the end face of the outside moving part 22aR. The optical fiber cable 30a can therefore be optically connected with the front end of an optical fiber 220 exposed at the end face of the projection 150b to be connected with.

As illustrated in FIG. 3B, the end face of the outside moving part 22aR of the ferrule 22a is formed with two guide pin holes 22h at the both sides of the optical fiber 30a at positions matching with the positions of the guide pin holes 230 formed in the end face of the projection 150b illustrated in FIG. 3C.

When guide pins are inserted into the guide pin holes 230 formed in the end face of the projection 150b and the guide pin holes 22h formed in the end face of the outside moving part 22aR of the ferrule 22a of the optical fiber connector 1a is inserted into the first sleeve 160a of the receptacle 160, the plurality of optical fibers 30a exposed at the end face of the outside moving part 22aR of the ferrule 22a and the plurality of optical fibers 220 exposed at the end face of the projection 150b of the optical module 150 match connect.

Further, a structure for obtaining precision of optical connection of the optical fibers in connection of the receptacle and housing and/or ferrule may of course also be applied.

As illustrated in FIG. 5, the body 150a of the optical module 150 has two packages 207 and 208. The two packages 207 and 208 carry a laser diode 204 as a light transmitting element, a photo-detector 205 as a light receiving element, and other optical elements. The package 208 is provided with various internal electronic circuits including the laser diode 204 and the photo-detector 205 and lead frame 210 for supplying power and signals to the internal electronic circuits. The lead frame 210 are connected to not illustrated external electronic circuits by not illustrated wiring.

The left front edge of the package 207 is formed with the projection 150b having the same sectional shape as the outside moving part (right small area part) 22a3 of the ferrule 22a.

The projection 150b is formed with an optical fiber hole 207k2 extending from the end face 207k1 to the right end of a carrying part 202 and holding the optical fiber 220.

As illustrated in FIG. 4C, when the optical module 150A is inserted into the second sleeve 160b of the receptacle 160 and the projection 150b is inserted in the opening of the window 160c and further the end face 207a of the package 207 on the projection 150b side abuts against the step face at the right side of the window 160c to come into facial contact, the insertion of the optical module 150 into the second sleeve 160b is stopped. The optical module 150 may be fixed to the receptacle 160 by adhesion or the optical module 160 may be fixed detachably to the receptacle 160 by engagement or another mechanical structure.

A length L2 (FIG. 5) of the projection 150b of the optical module 150 is longer than the length L1 of the window 60c illustrated in FIG. 6 (L2a>L1), so the end face 207k1 of the projection 150b projects out from the window 160c to the inside of the sleeve 160a. That is, the end face 207k1 of the projection 150b projects out to the inside of the sleeve 160a by exactly (L2a−L1). For example, when the length L1 of the window 160c is 0.5 mm and the length L2a of the projection 150b is 0.8 mm in the illustrated example, the front end of the projection 150b projects out into the sleeve 160a by exactly 0.3 mm.

Note that the length L2 of the projection 50b of the optical module 50 illustrated in FIG. 2 is substantially the same length as the length L1 of the window 60c. For example, L1=L2=0.5 mm. Therefore, the projection 50b does not pass through the opening of the window 60c to project out into the sleeve 10a.

In the second embodiment, the explanation is given of the case where the length L1 of the window 60c at the receptacle 60 illustrated in FIG. 2 and the length L1 of the window 160c of the receptacle 160 illustrated in FIG. 4A are substantially the same.

As illustrated in FIG. 4C, the optical module 150 is fixed in the receptacle 160 in the state where the projection 150b of the optical module 150 passes through the opening of the window 160c of the receptacle 160 and the front end of the projection 150b enters the sleeve 160a. The optical module 150 and the receptacle 160 are fixed at predetermined positions (locations) when the optical module 150 is fixed inside the receptacle 160 in this way.

Next, the attachment of the optical fiber connector 1a will be explained.

Guide pins are inserted into the guide pin holes 230 illustrated in FIG. 3C. The housing 20a of the optical fiber connector 1a is then inserted into the first sleeve 160a so that the guide pins inserted in the guide pin holes 230 are inserted into the guide pin holes 22h of the outside moving part 22aR of the ferrule 22a.

When the optical fiber connector 1a is deeply inserted into the first sleeve 160a, as illustrated in FIG. 6, the end face of the outside moving part 22aR of the ferrule 22a abuts against the end face 207k1 of the projection 150b of the optical module 150.

As illustrated in FIG. 6, when the housing 20a is pushed into the first sleeve 160a until the guard is shaped pressing part 20a2 of the housing 20a abuts against the front end of the first sleeve 160a, the latch 20a1 enters the engagement use opening 160a1 of the sleeve 160a and the optical fiber connector 1a fixed in the sleeve 160a.

Note that when the optical fiber connector 1a is attached to the sleeve 160a, a predetermined gap is required as a margin of safety between the front end of the housing 20d and the left side of the window 160c. Without this margin, if the housing 20d also abuts against the left side of the window 160c when the projection 150b and the ferrule 22a abut, the elastic force of the spring 21a will not be able to be properly exhibited. The preferable value for this gap is for example 0.9 mm or so.

In the second embodiment, the end face 207k1 of the projection 150b is positioned projecting out from the window 160c of the receptacle 160 into the first sleeve 160a along the axial direction by for example exactly (L2a−L1)= 0.3 mm. Accordingly, the abutting position of the end face of the right small area part 22aR of the ferrule 22a and the end face 207k1 of the projection 150b of the optical module 150 is located shifted into the first sleeve 160a by exactly 0.3 mm in comparison with the optical reference plane 70 illustrated in FIG. 2.

At this time, the ferrule 22a is pressed by the projection 150b, therefore the ferrule 22a presses against the spring 21a to compress it from the state of FIG. 4D to the state of FIG. 6. On the other hand, the ferrule 22a is pushed to the right side by the elastic force of the spring 21a and presses against the projection 150b. In this way, the end face of the outside moving part 22aR of the ferrule 22a and the end face 207k1 of the projection 150b come into facial contact.

As illustrated in FIG. 3B and FIG. 4D, the front end of the optical fiber 30a protrude up to the end face of the outside moving part 23aR of the ferrule 22a. The front end of the optical fiber 30a of the outside having parts 22aR are polished to a fiber protrusion for physical contact. Similarly, as illustrated in FIG. 3C, FIG. 4B, and FIG. 5, the front end of the optical fiber cable 220 protrude up to the end face of the projection 150b. The front end of the optical fiber cable 30a of the end face of the outside moving part 22aR are polished to a fiber protrusion for physical contact. Accordingly, when the end face of the outside moving part 22aR of the ferrule 22a and the end face 207k1 of the projection 150b come into facial contact, the optical fibers 30a and the optical fibers 220 are physical connected by the elastic force of the spring 21a.

Next, the connection load (pressing force) at this time will be compared with that of the optical fiber connection assembly illustrated in FIG. 2. In the optical fiber connection assembly of this embodiment, the length of the projection 150b of the optical module 150 is longer than the length of the projection 50b of the optical module 50 illustrated in FIG. 2 and the ferrule 22a pushes the spring further to the left side to compress it, so when using a spring 21a having the same characteristics, the repulsion force of the spring 21a becomes large. Accordingly, the connection load (connecting force) at the end faces of the optical fiber 30a and the optical fiber 220 in the optical fiber connection assembly of the present embodiment becomes that much higher.

The engagement of the latch 20a1 and the engagement use opening 160a1 may be released by pulling out the optical fiber connector 1a from the receptacle 160 in the state when pressing down the guard shaped pressing part 20a2 by the finger etc. to deform the pressing part 20a2.

Evaluation of Characteristics

An optical fiber connection assembly using the receptacle module of the second embodiment explained with reference to FIG. 3 to FIG. 6 was evaluated for its characteristics. The results will be explained next.

The optical fiber connection assembly evaluated was comprised of parts of the following specifications.

Figure 7B:
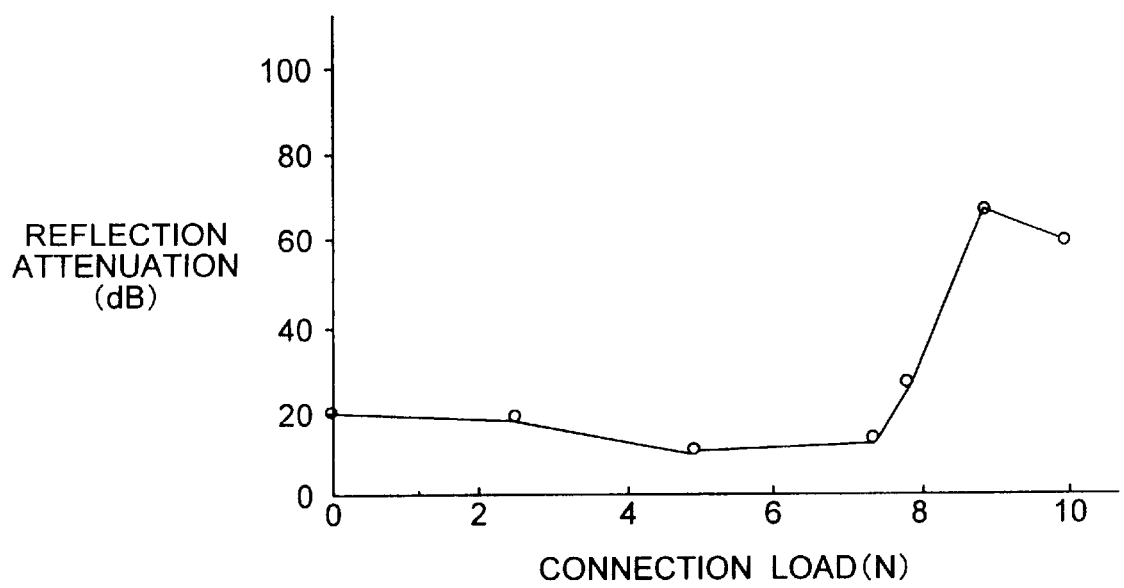
FIG. 7B is a graph of the relationship between the return loss and the connection load.

1. Receptacle 160
    Material: PPS (polyphenyl sulfide)
    Total length: 23 mm
    First sleeve 160a
        Inside width: 7.24 mm
        Inside height: 4.74 mm
        Length: 14 mm
    Opening of window 160c
        Inside width: 4.51 mm
        Inside height: 2.56 mm
        Length L1: 0.5 mm
2. Optical module 150
    Material: Epoxy resin
    Projection 150b
        Width: 4.4 mm
        Height: 2.5 mm
        Length L2: 0.8 mm
    Optical fibers: Commercially available SiO$_2$ based fibers, quartz
3. Optical fiber connector 1a
    Housing 20a
        Material: Polycarbonate
        Outer shape
            Width: 7.15 mm
            Height: 4.65 mm
            Length: 20.5 mm
        Inside shape
            Width: 5.6 mm
            Height: 3.3 mm
            Length: 15.3 mm
        Opening
            Width: 4.6 mm
            Height: 2.65 mm
        Length of inside space: 12.65 mm
    Ferrule 22a
        Material: PPS (polyphenyl sulfide)
        Total length: 8.0 mm
        Middle large area part 22aM
            Width: 5.0 mm
            Height: 3.05 mm
            Length: 2.0 mm
        Left small area part 22aR
            Width: 5.0 mm
            Height: 3.05 mm
            Length: 2.0 mm
        Right small area part 22aR
            Width: 4.4 mm
            Height: 2.5 mm
            Length: 6 mm
        Optical fibers: Commercially available SiO$_2$ based fibers, quartz
4. Spring 21a
    Material: SUS 304
    Diameter: 3.5 mm
    Length in natural state: 13.4 mm
    Spring coefficient (Young's modulus): 1.82 N/mm Relationship Between Amount of Movement of Ferrule and Connection Load FIG. 7A is a graph of the relationship between the amount of movement of the ferrule 22a (ordinate) and connection load (abscissa). FIG. 7B is a graph of the relationship between the return loss (ordinate) and the connection load (abscissa).

From these graphs, in a configuration where an MT-RJ connector 1a illustrated in FIG. 4D is inserted into a receptacle module illustrated in FIG. 4C, when considering the side pull stress or vibration, a minimum connection load of about 8.5N is required for reducing the return loss. That is, at least 1.09 times the minimum connection load of 7.8N when connecting optical fiber connectors illustrated in FIG. 1 is considered required.

In the first embodiment illustrated in FIG. 2, as shown by the point A, the ferrule 22a is pushed 0.2 mm to the left side. The connection load at this time is about 8N. This connection load does not reach the minimum connection load of 8.5N when considering the above side pull stress or vibration.

As opposed to this, in the second embodiment illustrated in FIG. 3 to FIG. 6, the amount of movement of the ferrule 22a in the receptacle module illustrated in FIG. 2 was 0.3 mm greater. That is, in the above example, the ferrule 22a of the second embodiment moves about 0.5 mm. As shown by the point B of FIG. 7A, the connection load when the ferrule 22a is pushed 0.5 mm to the left is about 8.8N. This is greater than the minimum connection load of 8.5N when considering the above side pull stress or vibration.

With such a connection load, even when an external force is applied to the optical fiber connector 1a and the receptacle 160 in a direction orthogonal to the axial direction, that is, the direction of the arrow A of FIG. 6, it is possible to suppress deviation or a gap between the optical fiber cable 30a and the optical fiber cable 220.

Therefore, according to the receptacle module (optical fiber connection assembly) of the second embodiment, a reduction of the characteristics of the optical signals input and output to and from the optical module 150 through the optical fiber cables 30a and 220 can be avoided.

Insertion Loss

Figure 8A:
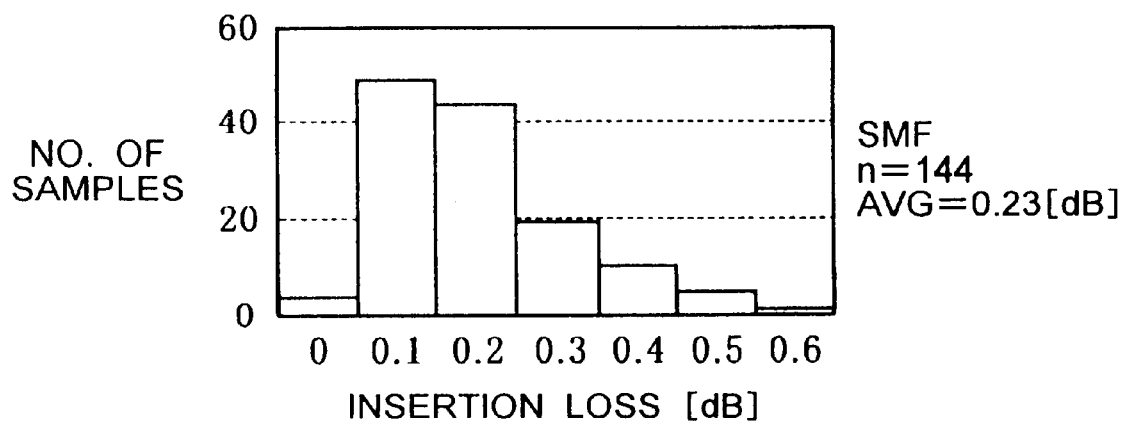
FIGS. 8A and 8B are graphs of the insertion loss measured for a plurality of samples of optical fiber cables of the optical fiber connector and the optical module illustrated in FIGS. 4C to 4D of the single mode optical fiber (SMF) type and the grated index fiber (GIF) type.

FIG. 8A is a graph of the insertion loss measured for 144 samples of optical fiber cables 30a and 220 of the single mode optical fiber (SMF) type. The abscissa indicates the insertion loss (dB), while the ordinate indicates the number of samples.

Note that, "insertion loss" means, as illustrated in FIG. 6, the insertion loss of an optical signal at a connecting part when inserting an optical fiber connector 1a holding an optical fiber 30a, illustrated in FIG. 6, and a projection 150b of an optical module 150 holding an optical fiber 220 into a receptacle 160 so as to optically connect the right end face of the optical fiber cable held in the optical fiber connector 1a and the left end face of the optical fiber cable held in the projection 150b. As the wavelength of the optical signal, for example, 1.31 μm was used.

Figure 8B:
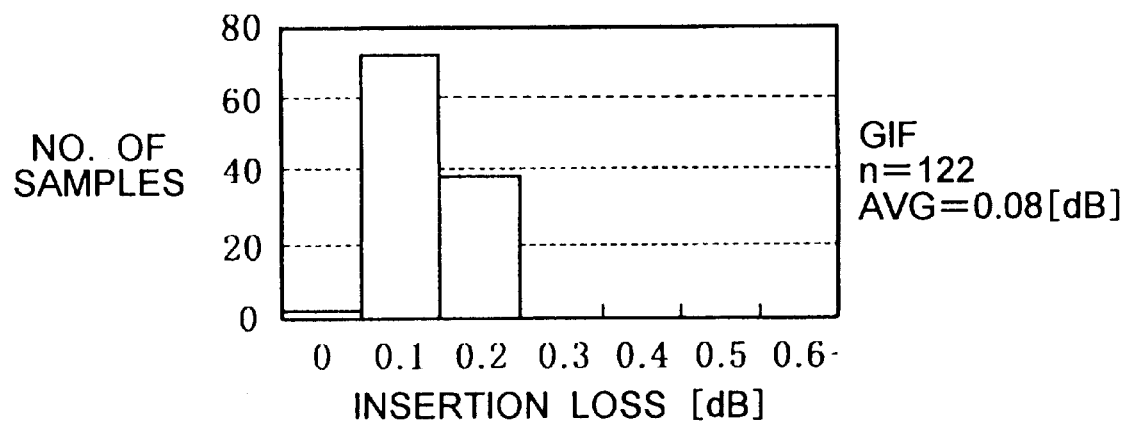

FIG. 8B is a graph of the insertion loss measured for 112 samples of optical fiber 30a and 220 of the grated index optical fiber (GIF) type. The abscissa indicates the insertion loss (dB), while the ordinate indicates the number of samples.

As shown in FIG. 8A, when using the SMF type, the insertion loss was within a range of 0.1 to 0.5 dB centered about 0.1 and 0.2 dB and the average was 0.23 dB.

As shown in FIG. 8B, when using the GIF type, the insertion loss was within a range of substantially 0.1 and 0.2 dB in all of the 112 samples and the average was 0.08 dB.

In this way, according to the receptacle module (optical fiber connection assembly) of the second embodiment, the insertion loss can be made sufficiently small.

Return Loss

Figure 9A:
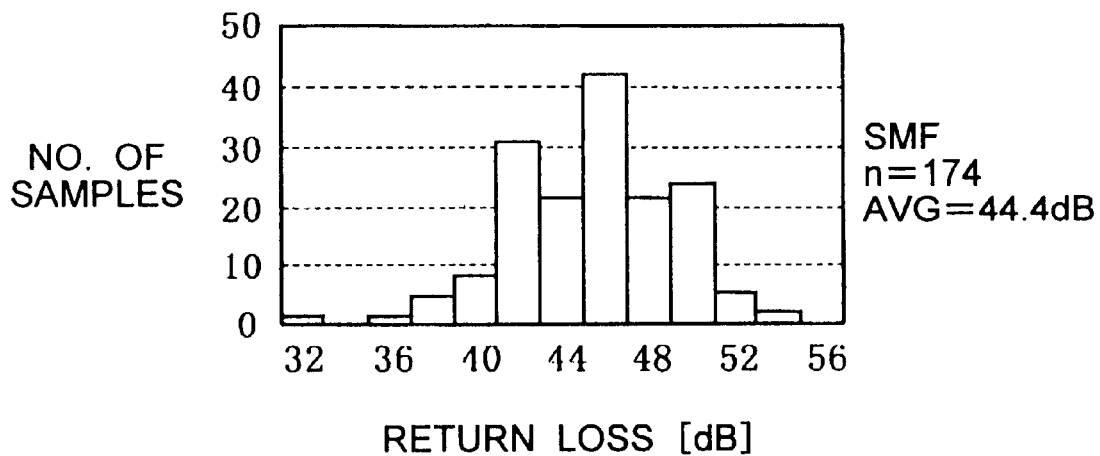
FIGS. 9A and 9B are graphs of the return loss measured for a plurality of samples of optical fiber cables of the optical fiber connector and the optical module illustrated in FIGS. 4C to 4D of the single mode optical fiber (SMF) type and the grated index fiber (GIF) type.
Figure 9B:
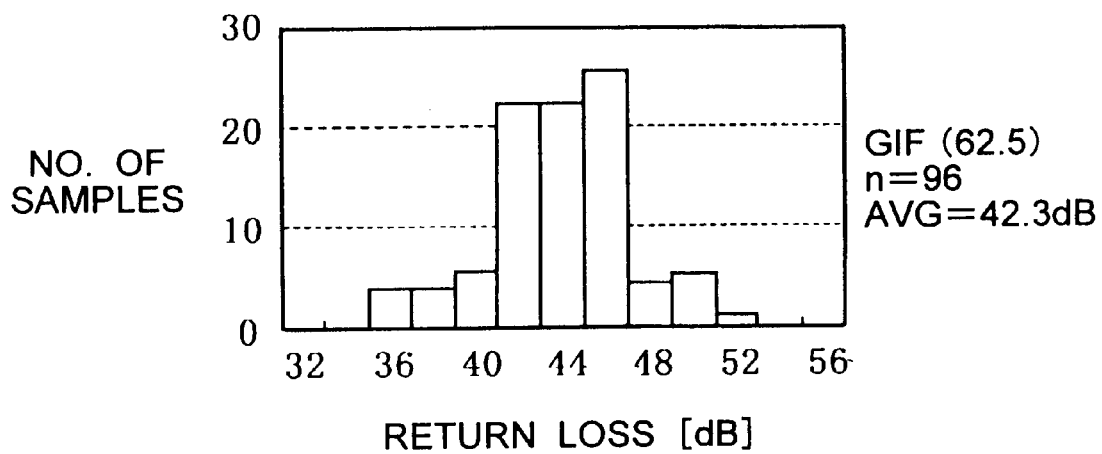

FIG. 9A is a graph of the return loss measured for 174 samples of the optical fiber 30a and 220 of the SMF type, while FIG. 9B is a graph of the return loss measured for 96 samples of optical fiber 30a and 220 of the GIF type. In FIGS. 9A and 9B, the abscissa indicates the return loss (dB) in units of 2 dB, and the ordinate indicates the number of samples.

"Return loss" indicates attenuation of the reflected light of an optical signal transmitted via the optical fiber 30a and 200 occurring at the connecting part of the end face of the right small area part 22aR of the ferrule 22a of the optical connector 1a and the end face 207k1 of the projection 150b of the optical module 150.

As shown in FIG. 9A, when using the SMF type, the return loss was within a range of 36 to 54 dB and the average return loss was 44.4 dB.

As shown in FIG. 9B, when using the GIF type, the return loss was within a range of 36 to 52 dB and the average return loss was 42.3 dB.

In this way, according to the receptacle module (optical fiber connection assembly) of the second embodiment, the return loss can be made sufficiently small.

Repeated Durability Characteristic

Figure 10A:
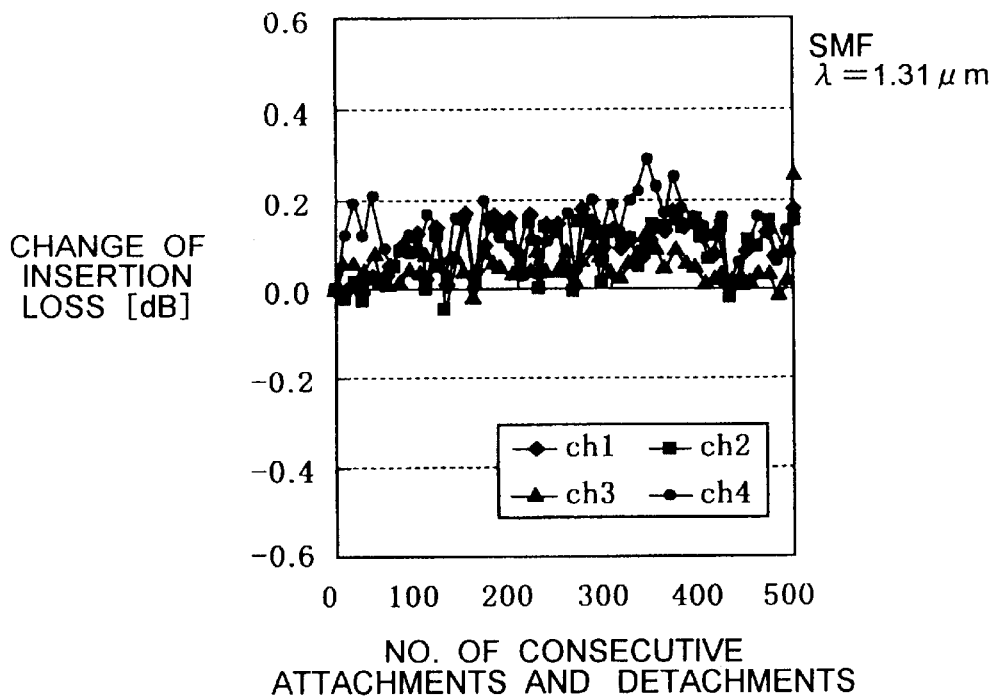
FIGS. 10A and 10B are graphs of the change of the insertion loss in 4 ch optical fibers when using optical fiber cables of the optical connector and optical module illustrated in FIGS. 4C to 4D of the SMF and GIF type, setting the wavelength λ of the optical signal to be transmitted at 1.31 μm, and repeatedly connecting and disconnecting the optical fiber connector to and from the receptacle.

FIG. 10A is a graph of the change of the insertion loss in the four parallel optical fibers illustrated in FIG. 3B and FIG. 3C using optical fiber 30a and 220 of the SMF type, setting the wavelength $\mu$ of the optical signal to be transmitted at 1.31 $\mu$m, and repeatedly connecting and disconnecting the optical fiber connector 1a to and from the first sleeve 160a of the receptacle 160 of the receptacle module 0 to 500 times.

Figure 10B:
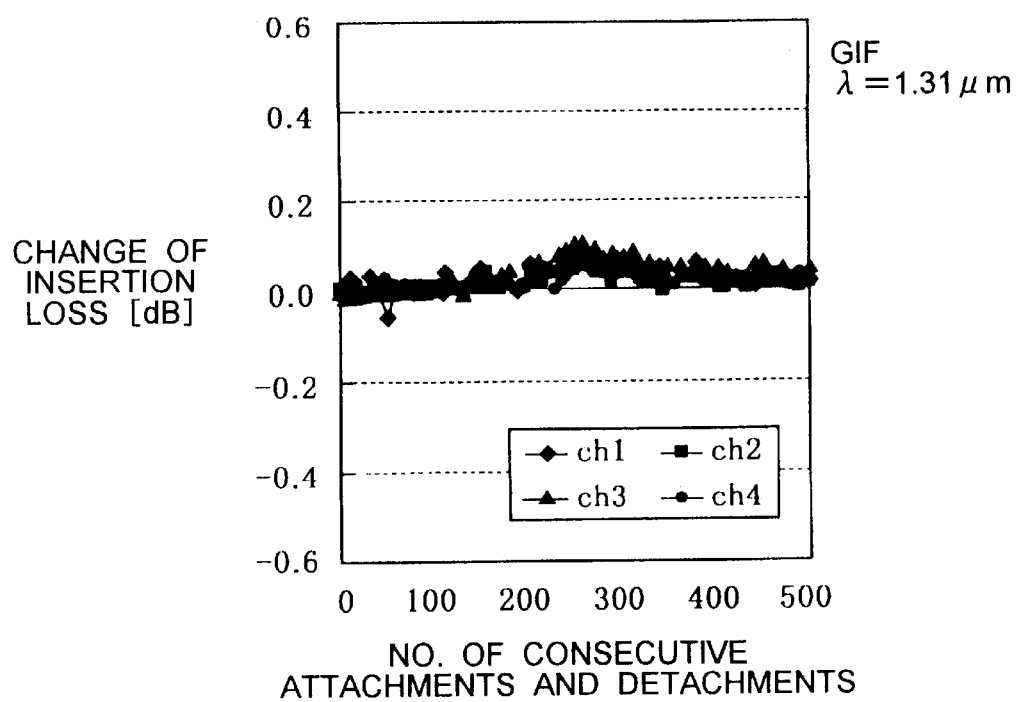

FIG. 10B is a graph of the change of the insertion loss in the four parallel optical fibers illustrated in FIG. 3B and FIG. 3C using optical fiber 30a and 220 of the GIF type, setting the wavelength $\lambda$ of the optical signal to be transmitted at 1.31 $\mu$m, and repeatedly connecting and disconnecting the optical fiber connector 1a to and from the first sleeve 160a of the receptacle 160 of the receptacle module 0 to 500 times.

In FIGS. 10A and 10B, the ordinate indicates the change of the insertion loss, and the abscissa indicates the number of times of attachment and detachment.

As shown in FIG. 10A, when using the SMF type, for 0 to 500 cyclic connecting and disconnecting operations, the change of the insertion loss for all optical fibers of the optical fiber cables 30a and 220 was within a range of about 0.0 to about 0.3 dB.

As shown in FIG. 10B, when using the GIF type, for 0 to 500 cyclic connecting and disconnecting operations, the change of the insertion loss for all optical fibers of the optical fiber cables 30a and 220 was within a range of about 0.0 to about 0.1 dB.

FIG. 11 is a graph of the change of the insertion loss in the four parallel optical fibers illustrated in FIG. 3B and FIG. 3C using optical fiber 30a and 220 of the SMF type, setting the wavelength $\lambda$ of the optical signal to be transmitted at 1.31 $\mu$m, and repeatedly connecting and disconnecting the optical fiber connector 1a to and from the first sleeve 160a of the receptacle 160 of the receptacle module 1500 to 2000 times.

As shown in FIG. 11, when using the SMF type, for 1500 to 2000 cyclic connecting and disconnecting operations, the change of the insertion loss for all optical fibers of the optical fiber 30a and 220 was within a range of about 0.1 to about 0.15 dB.

Side Pull Stress Characteristics

Figure 12A:
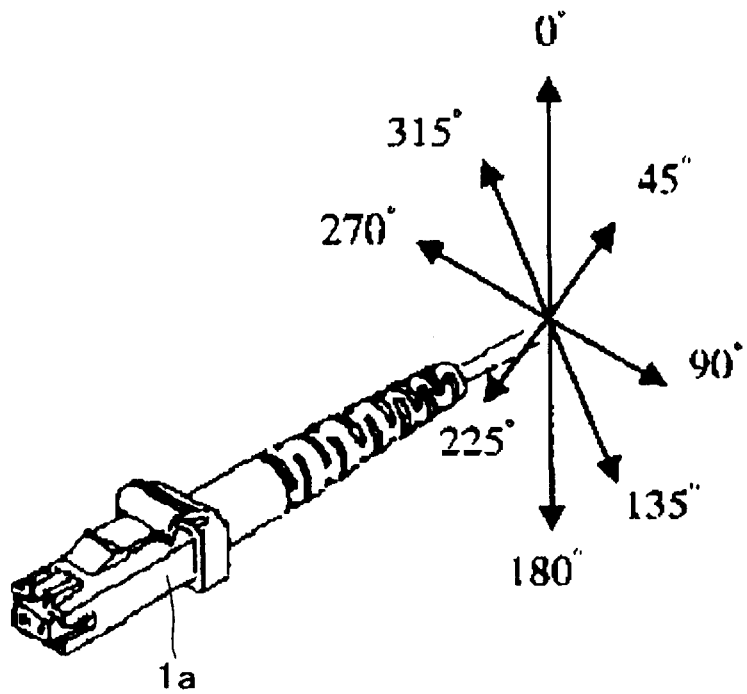
FIGS. 12A and 12B are graphs of the change of the insertion loss in 4 ch optical fibers in a case of causing side pull stress from various directions in the optical fiber connector attached to the receptacle illustrated in FIGS. 4C to 4D.
Figure 12B:
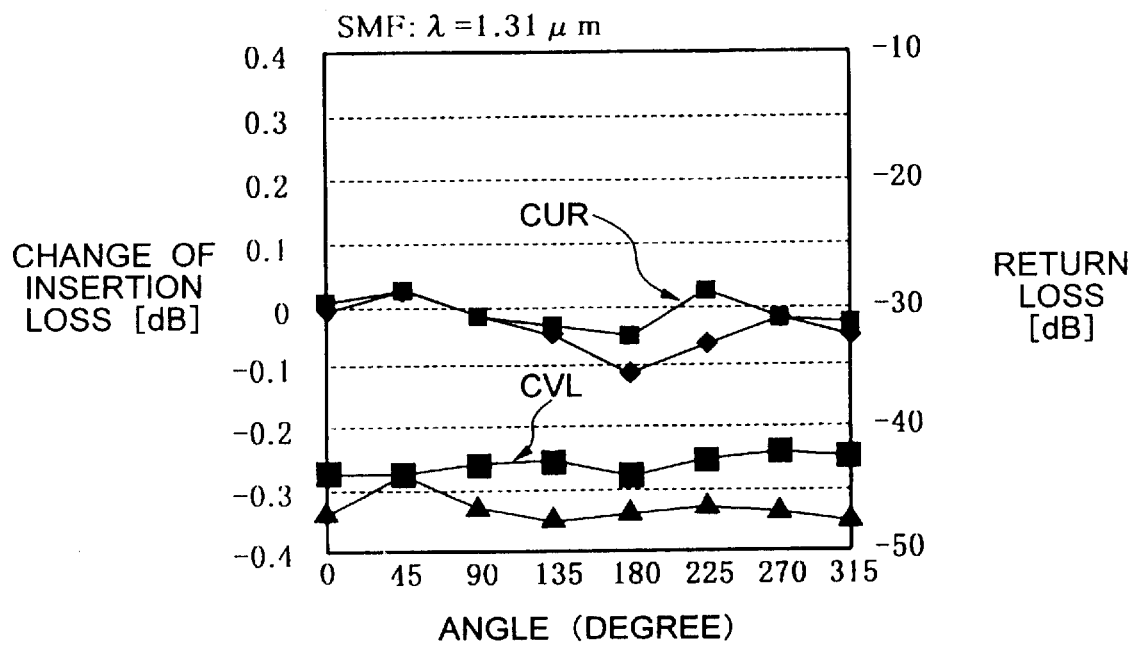

FIG. 12B is a graph of the change of the insertion loss in the four parallel optical fibers of the optical fiber 30a and 220 illustrated in FIG. 3B and FIG. 3C in a case of causing side pull stress (sideward tensile stress, sideward tensile load) in the optical fiber connector 1a attached to the receptacle 160 in directions of 0°, 180°, 45°, 225°, 90°, 270°, 135°, and 315° as shown in FIG. 12A. In this case, use was made of optical fiber 30a and 220 of the SMF type, and the wavelength $\lambda$ of the optical signal to be transmitted was set to 1.31 $\mu$m.

In FIG. 12B, the abscissa indicates the angle (direction) of the side pull, the ordinate on the left side indicates the change of the insertion loss, and the ordinate on the right side indicates the return loss.

As shown in FIG. 12B, the change of the insertion loss in this case (scale on the left side ordinate) becomes about −0.1 to about 0.05 dB, while the return loss (scale on the right side ordinate) becomes −40 to −50 dB.

Note that, in the receptacle module of the first embodiment shown in FIG. 2, the change in the insertion loss was about 0.6 dB, and the change of the return loss was about −20 dB.

In this way, according to the second embodiment, it is learned that in the state where side pull stress is applied, the change of the insertion loss was remarkably lowered and the change of the return loss was also improved.

Temperature Characteristic

Figure 13A:
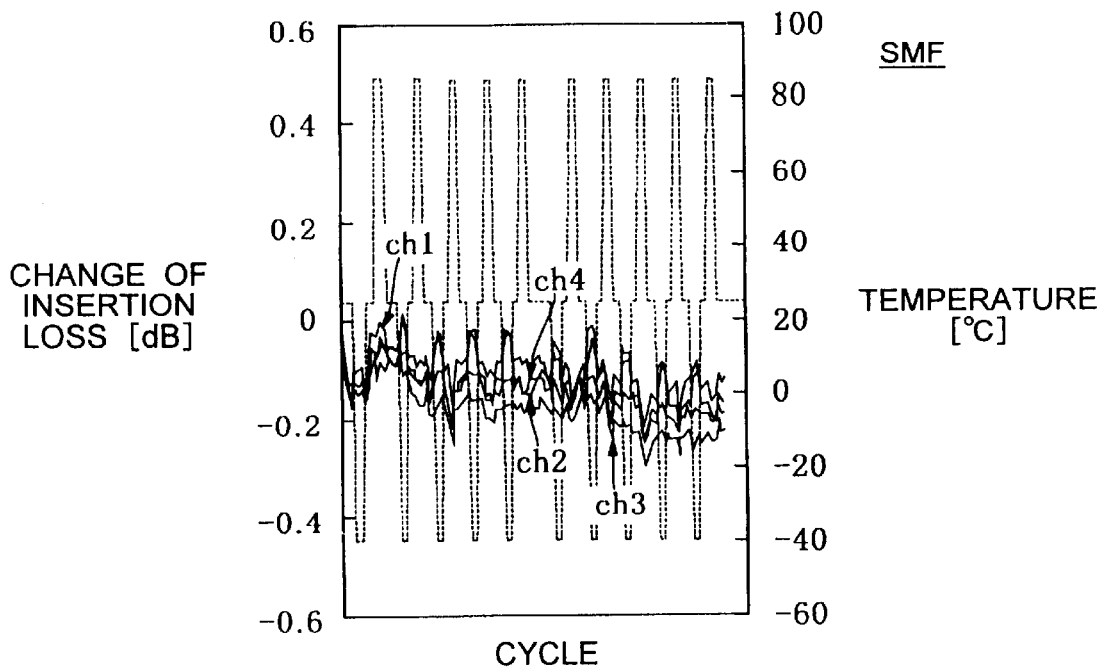
FIGS. 13A and 13B are graphs of the change of the insertion loss and the return loss in 4 ch optical fibers when using optical fiber cables of the optical fiber connector and the optical module illustrated in FIGS. 4C to 4D of the SMF type, setting the wavelength λ of the optical signal to be transmitted at 1.31 μm, and cyclically giving a temperature change to the receptacle with the optical fiber connector 1a attached.

FIG. 13A is a graph of the change of the insertion loss in the four parallel optical fibers illustrated in FIG. 3B and FIG. 3C when using optical fiber 30a and 220 of the SMF type, setting the wavelength $\lambda$ of the optical signal to be transmitted at 1.31 $\mu$m, and cyclically giving a temperature change of a range of −40 to +85° C. to the receptacle 160 with the optical fiber connector 1a attached.

Figure 13B:
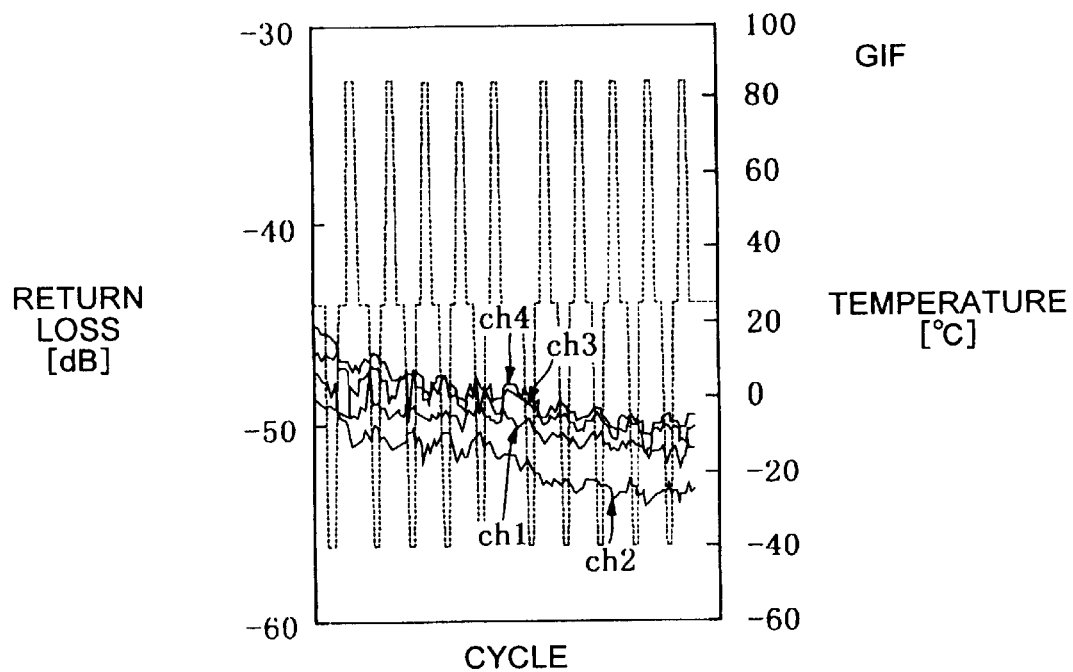

FIG. 13B is a graph of the return loss in the four parallel optical fibers illustrated in FIG. 3B and FIG. 3C when using optical fiber 30a and 220 of the SMF type, setting the wavelength $\lambda$ of the optical signal to be transmitted at 1.31 $\mu$m, and cyclically giving a temperature change of a range of −40 to +85° C. to the receptacle 160 with the optical fiber connector 1a attached.

In FIG. 13A, the left side ordinate indicates the change of the insertion loss, the right side ordinate indicates the temperature, and the abscissa indicates the number of times of attachment and detachment per unit time (cycle).

In FIG. 13B, the left side ordinate indicates the return loss, the right side ordinate indicates the temperature, and the abscissa indicates the number of times of attachment and detachment per unit time (cycle).

As shown in FIG. 13A, the change of the insertion loss due to a cyclic change of the temperature in the range of −40 to +85° C. is within a range of about 0.02 to about 0.3 dB. Also, as shown in FIG. 13B, the return loss due to a cyclic change of the temperature in the range of −40 to +85° C. is within a range of about −46 to about −52 dB.

Attachment and Detachment Characteristics of Laser Diode and Photo-detector

Figure 14A:
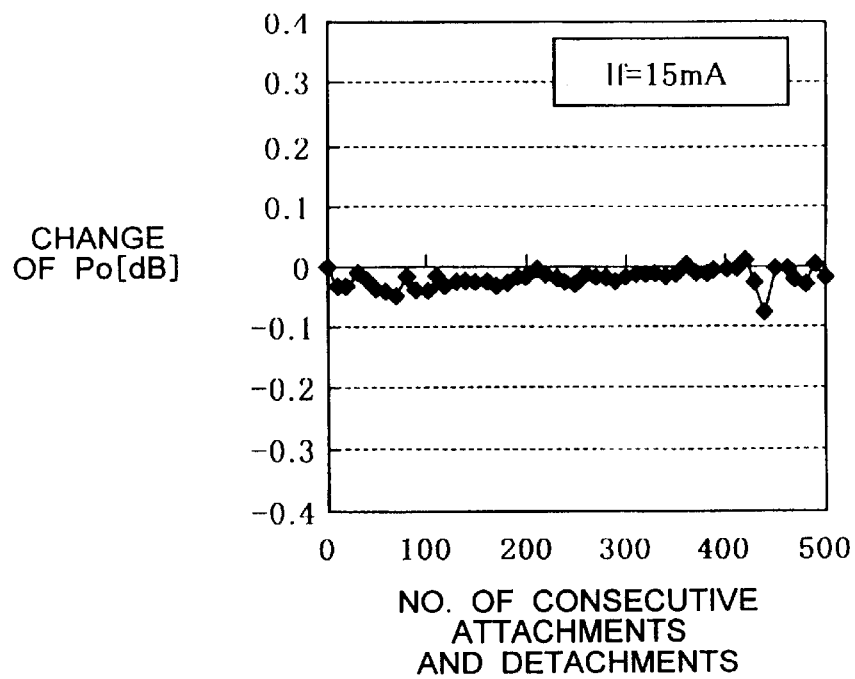

FIG. 14A is a graph of the connecting and disconnecting characteristics relating to the optical output power change of the laser diode 204 shown in FIG. 5, in which the abscissa indicates the number of times of connecting and disconnecting, and the ordinate indicates the change in optical output.

Figure 14B:
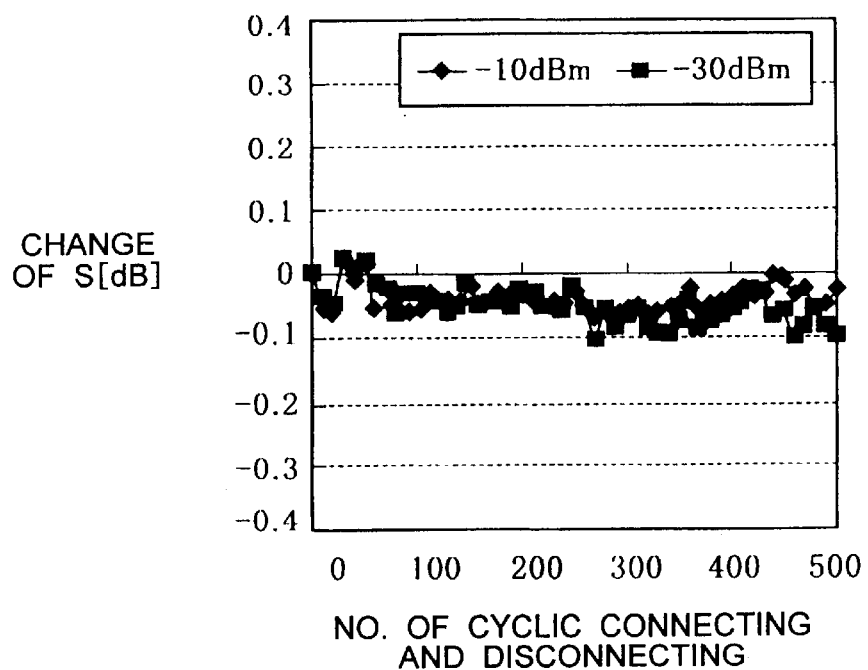
FIG. 14B is a graph of the connecting and disconnecting characteristics relating to the optical input sensitivity of the photo-detector shown in FIG. 5.

FIG. 14B is a graph of the connecting and disconnecting characteristics relating to the optical input sensitivity change of the photo-detector 205 shown in FIG. 5, in which the abscissa indicates the number of times of connecting and disconnecting, and the ordinate indicates the optical input sensitivity change.

As shown in FIG. 14A, the change of the optical output of the laser diode 204 is within a range of about −0.1 to about 0 dB even with connecting and disconnecting 0 to 500 times.

As shown in FIG. 14B, the change of the optical sensitivity of the photo-detector 205 is within a range of about −0.12 to about 0.05 dB even with connecting and disconnecting 0 to 500 times.

As explained above, the characteristics of the receptacle module of the present embodiment are as good as when connecting the freely movable optical fiber connectors shown in FIG. 1. Particularly, the side pull stress characteristics are greatly improved compared with the receptacle module (optical fiber connection assembly) of the first embodiment shown in FIG. 2.

Third Embodiment

Next, an explanation will be given of a receptacle module according to a third embodiment of the present invention and an optical fiber connection assembly using the same with reference to FIGS. 15A to 15D and FIG. 16.

Figure 15A:
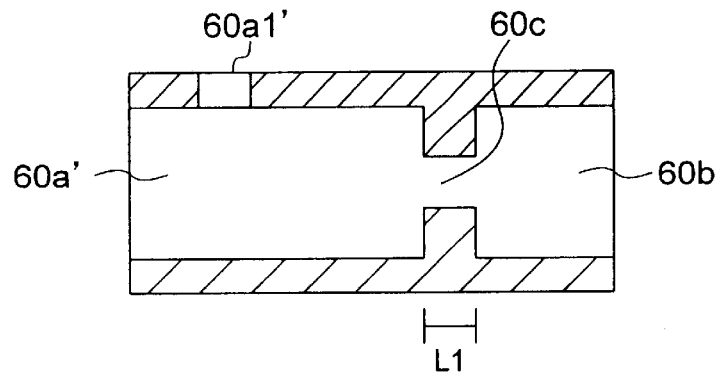
FIG. 15A is a sectional view of the receptacle of the third embodiment of the present invention.
Figure 15B:
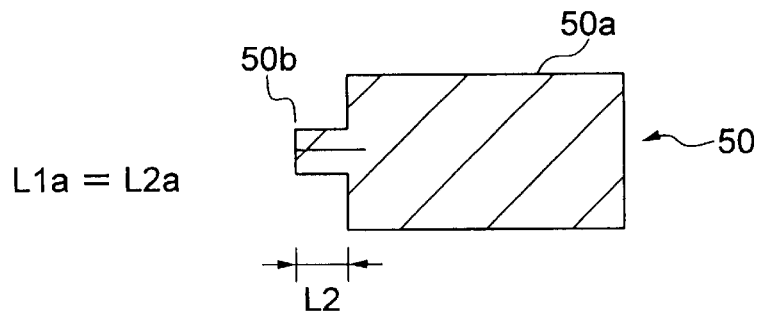
FIG. 15B is a sectional view of an optical module of the third embodiment of the present invention.
Figure 15C:
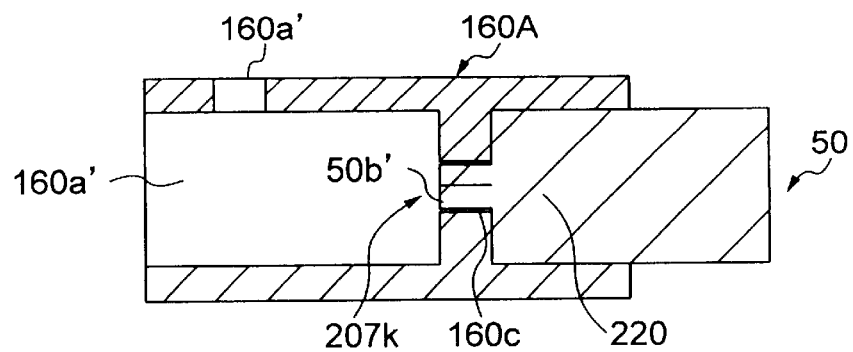
FIG. 15C is a view of the state where the optical module is fixed by insertion into a first sleeve of the receptacle.
Figure 15D:
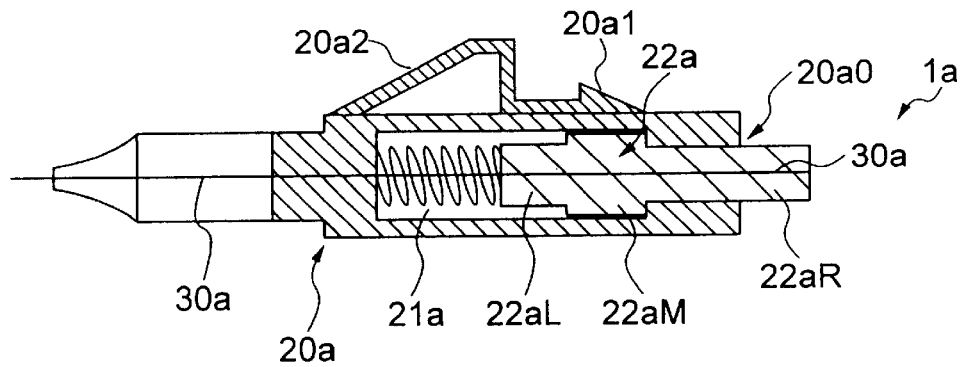
FIG. 15D is a sectional view of the optical fiber connector.

FIG. 15A is a sectional view of the receptacle of the third embodiment of the present invention, FIG. 15B is a sectional view of an optical module of the third embodiment of the present invention, FIG. 15C is a view of the state where the optical module is fixed by insertion into a first sleeve of the receptacle, and FIG. 15D is a sectional view of the optical fiber connector.

Figure 16:
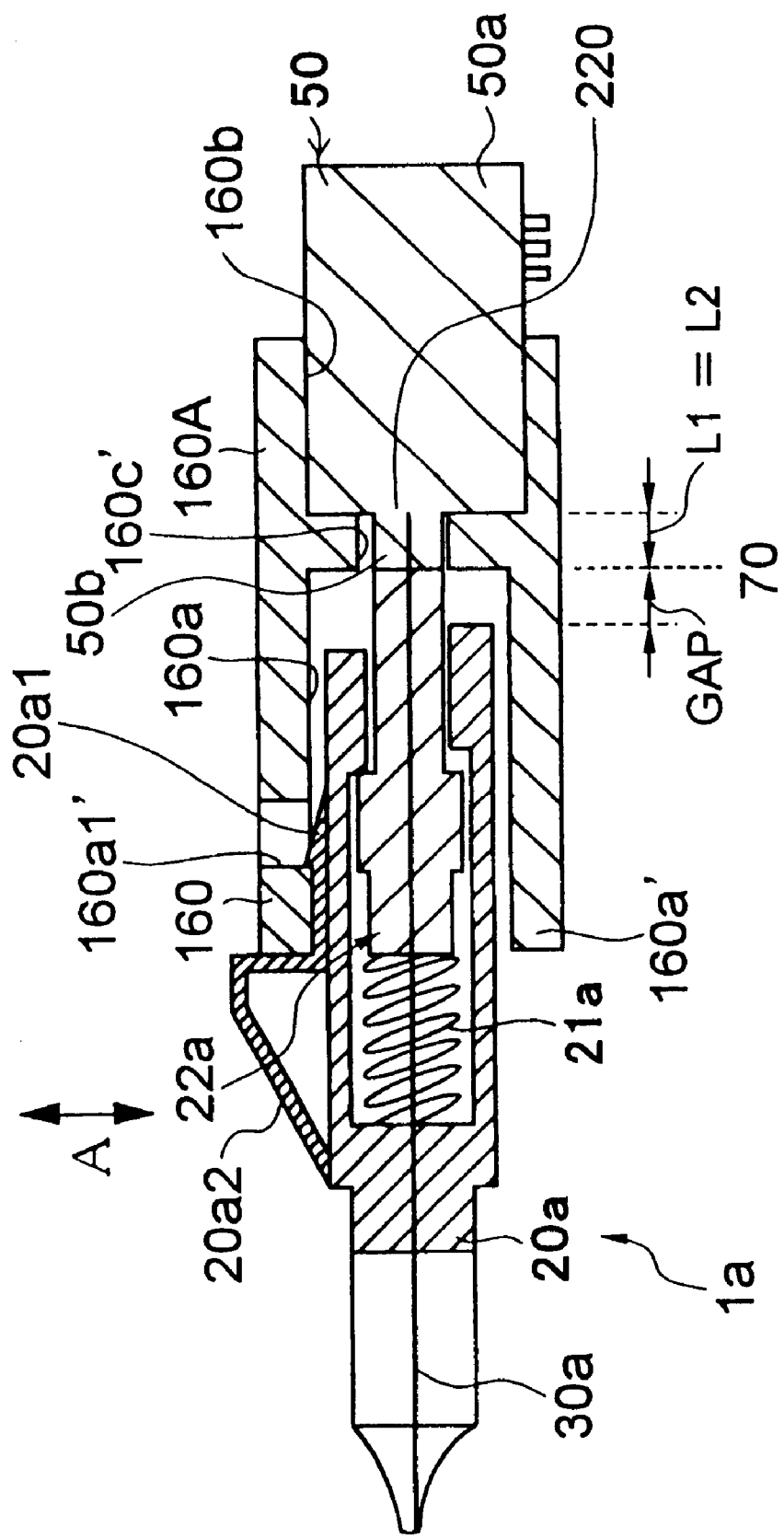
FIG. 16 is a sectional view of an optical fiber connection assembly comprised of the receptacle module illustrated in FIG. 15C and the optical fiber connector inserted in it.

FIG. 16 is a sectional view of an optical fiber connection assembly comprised of the receptacle module illustrated in FIG. 15C and the optical fiber connector inserted in it.

The third embodiment relates to an improvement of the receptacle module and optical fiber connection assembly of the first embodiment explained with reference to FIG. 2.

The receptacle 160A of the third embodiment, as shown in FIG. 15A, is formed with the position of the engagement use opening 160a1' of the first sleeve 160a' shifted to the right by exactly the distance of (L2a−L1) in the second embodiment, for example, exactly 0.3 mm.

The optical module 50 illustrated in FIG. 15B is similar to that of the first embodiment. That is, the length L2 of the projection 50b of the optical module 50 is the same as the length (width) L1 of the window 160c or for example 0.5 mm. Therefore, when attaching the optical module 50 to the second sleeve 160b of the receptacle 60A, as illustrated in FIG. 15C, the end face of the projection 50b registers with the left side face of the window 160c. That position becomes the optical reference plane 70. The positional relationship is the same as the state illustrated in FIG. 2.

In the third embodiment, however, the position of the engagement use opening 160a1' formed in the first sleeve 160a1 of the receptacle 160 is shifted to the right by for example exactly 0.3 mm, so when the optical fiber connector 1a the same as in the first and second embodiment illustrated in FIG. 15D is fully inserted into the first sleeve 60a' and the latch 20a1 engages with the engagement use opening 60a1', the ferrule 22a is pushed by the end face of the projection 50b by exactly 0.3 mm more than in the first embodiment.

In this way, the amount of movement of the ferrule 22a due to being abutted against and pushed by the projection 50b becomes similar to that of the second embodiment explained with reference to FIG. 3 to FIG. 6.

Therefore, the characteristics of the receptacle module of the third embodiment become the same as those explained with reference to FIG. 7 to FIG. 14.

In the optical fiber connection assembly of the third embodiment, the gap between the left side face of the window 60c and the housing 20a becomes shorter than those of the first and second embodiments. The gaps in FIG. 2 and FIG. 6 were for example 0.9 mm, but the gap in FIG. 16 becomes shorter by exactly the length by which the engagement use opening 60a1' is shifted to the right, for example, by exactly 0.3 mm, or becomes 0.6 mm.

Fourth Embodiment

Next, an explanation will be given of a receptacle module of a fourth embodiment of the present invention and an optical fiber connection assembly using the same with reference to FIGS. 17A to 17D and FIG. 18.

Figure 17A:
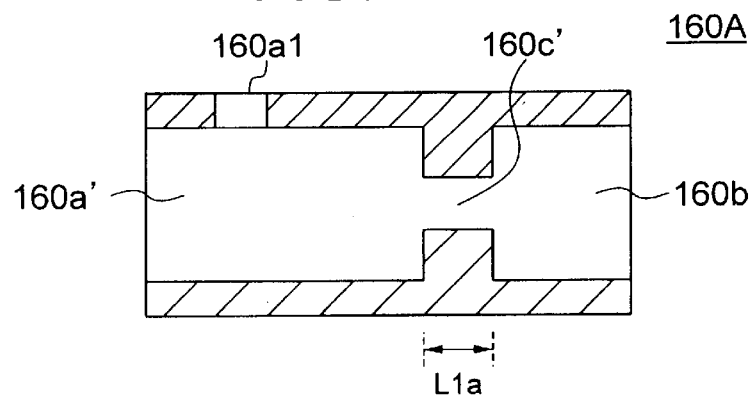
FIG. 17A is a sectional view of the receptacle of the fourth embodiment of the present invention.
Figure 17B:
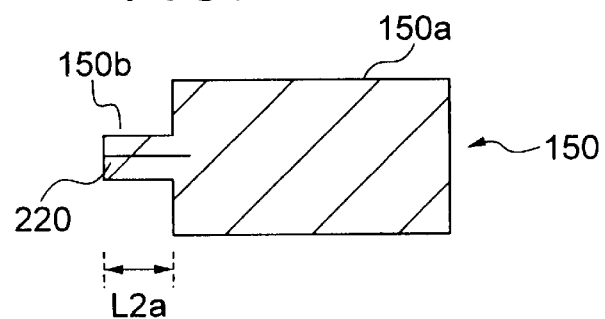
FIG. 17B is a sectional view of an optical module of the fourth embodiment of the present invention.
Figure 17C:
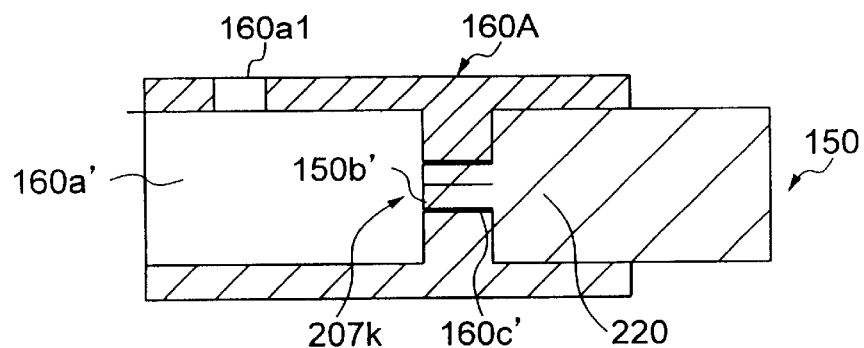
FIG. 17C is a view of the state where the optical module is fixed by insertion into a first sleeve of the receptacle.
Figure 17D:
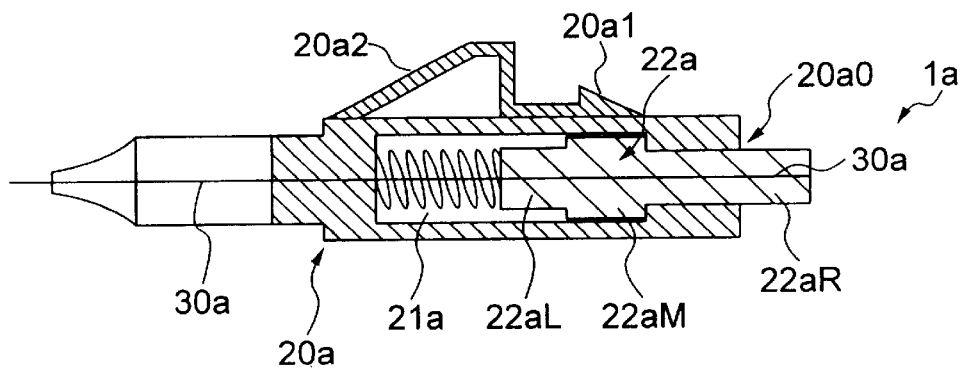
FIG. 17D is a sectional view of the optical fiber connector.

FIG. 17A is a sectional view of the receptacle of the fourth embodiment of the present invention, FIG. 17B is a sectional view of an optical module of the fourth embodiment of the present invention, FIG. 17C is a view of the state where the optical module is fixed by insertion into a first sleeve of the receptacle, and FIG. 17D is a sectional view of the optical fiber connector.

Figure 18:
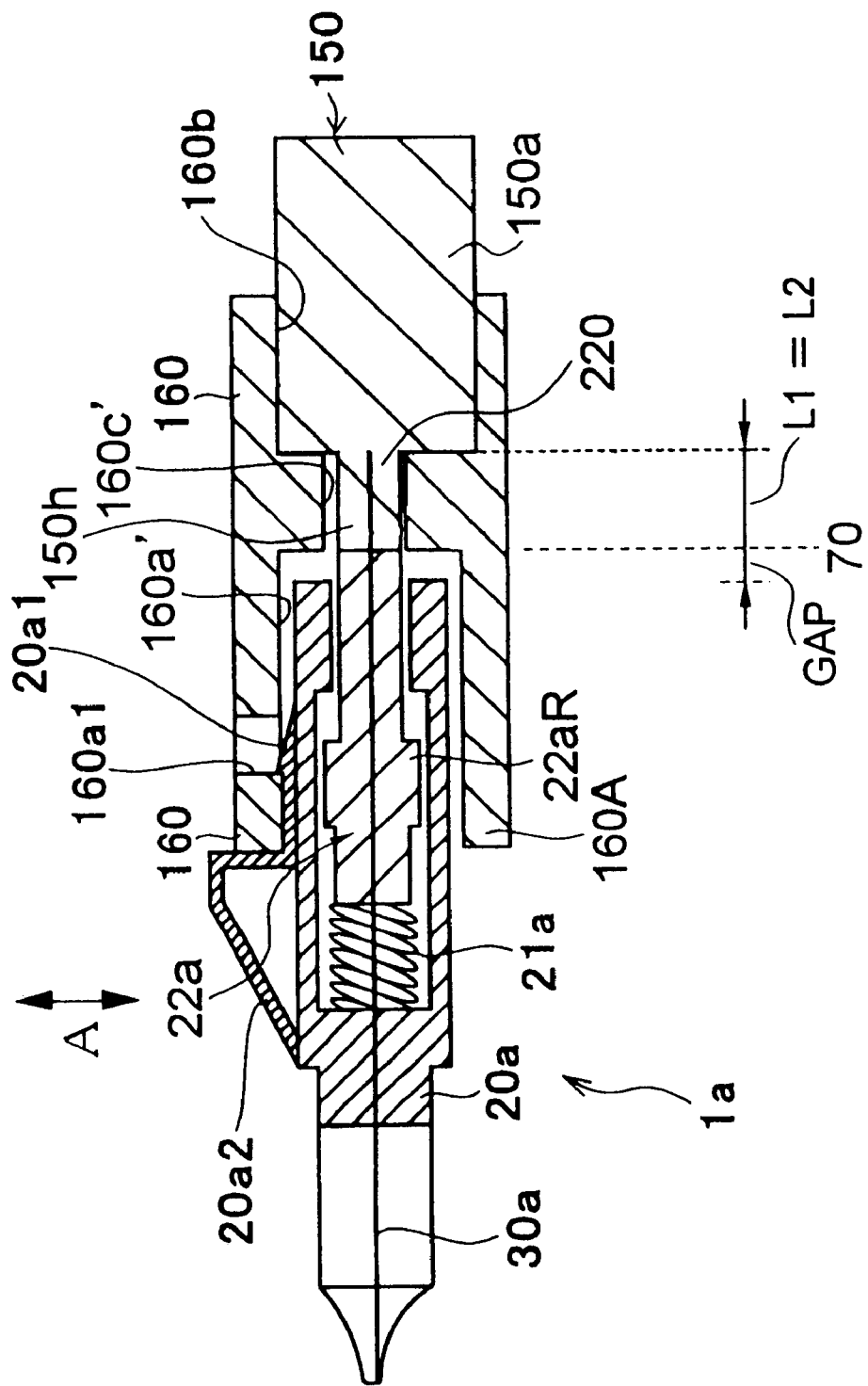
FIG. 18 is a sectional view of an optical fiber connection assembly comprised of the receptacle module illustrated in FIG. 17C and the optical fiber connector inserted in it.

FIG. 18 is a sectional view of an optical fiber connection assembly comprised of the receptacle module illustrated in FIG. 17C and the optical fiber connector inserted in it.

The third embodiment relates to a modification of the receptacle module and the optical fiber connection assembly of the second embodiment explained with reference to FIG. 3 to FIG. 6. That is, the receptacle module and the optical fiber connection assembly of the fourth embodiment are configured resembling the receptacle module and the optical fiber connection assembly of the second embodiment explained with reference to FIGS. 4A to 4D to FIG. 6.

The receptacle 160A of the fourth embodiment, as illustrated in FIG. 7A, has a length (width) L1a of the window 160c' changed from the for example L1=0.5 mm of the first and third embodiments to a length substantially equal to length L2a, for example, L2a=0.8 mm, of the projection 150b of the optical module 150 illustrated in FIG. 17B, that is, a length L1a of 0.8 mm. With the exception of the shortening of the depth of the first sleeve 160a' by the increase in the length (width) L1a of the window 160c' (or the shortening of the depth of the second sleeve 160b), the configuration is the same as that of the receptacle module (optical fiber connection assembly) of the second embodiment.

As illustrated in FIG. 17C, when attaching the optical module 150 in the second sleeve 160b of the receptacle 160A, the front end face 207k of the projection 150b of the optical module 150 and the left side face of the window 160c' come into register.

The optical fiber connector 1a illustrated in FIG. 17D is the same as that illustrated in FIG. 4D.

FIG. 18 is a sectional view of the state of attachment of the optical fiber connector 1a to the first sleeve 160a' of the receptacle module illustrated in FIG. 17C.

The position where the end face of the outside moving part 22a of the ferrule 22a abuts against the end face 207k of the projection 150b when the optical fiber connector 1a is inserted in the first sleeve 160a' is the same as that in the second embodiment explained with reference to FIG. 3 to FIG. 6, so the connection load at the end faces of the optical fiber cable 30a of the optical fiber connector 1a and the optical fiber 220 of the projection 150b becomes the same as in the second embodiment. Therefore, the characteristics of the receptacle module of the fourth embodiment become the same as those explained with reference to FIG. 7 to FIG. 14.

In the optical fiber connection assembly of the fourth embodiment, the left side face of the window 160c' has a shorter gap with the housing 20a. The gap in FIG. 6 was for example 0.9 mm, but the gap in FIG. 18 becomes shorter or 0.6 mm by exactly the amount of increase of length L1a of the window 160c1, for example, 0.3 mm.

The above numerical values, for example, the dimensions of the optical fiber connection assembly, the materials of the optical fiber connection assembly, etc. were all illustrations. The present invention is not limited to these values or materials when being worked.

The first to fourth embodiments of the present invention explained above illustrated various means of making the connection load between optical fibers for example more than 1.09 times that of the case of connecting optical fiber connectors together so as maintain the connection between optical fibers even in the face of side pull stress and lateral vibration and to prevent a reduction in the characteristics illustrated in FIG. 7 to FIG. 14 when optically connecting an optical fiber cable 30a in an MT-RJ connector, for example, various optical fiber connectors 1a with dimensions illustrated in FIG. 4A within standard limits, to the optical fiber 220 of the optical module.

While the invention has been described with reference to specific embodiment chosen for purpose of illustration, it should be apparent that numerous modifications could be made thereto by those skilled in the art without departing from the basic concept and scope of the invention.

For example, in the above embodiments, as illustrated in FIGS. 3B and 3C, the explanation was given with reference to the case of using optical fiber 30a and 200 containing four optical fibers, but the present invention can also be applied to a case of using optical fiber cables containing a single optical fiber or two, three, or more than four optical fibers.

Summarizing the effects of the present invention, as explained above, according to the receptacle module of the present invention and the optical fiber connection assembly using the same, even when the spring strength of the optical fiber connector is low, the connection between the optical fiber connector and the optical module in the receptacle can be made strong and even when external force is applied to a direction orthogonal to the longitudinal (axial) direction, deviation or a gap at the connecting part can be suppressed. As a result, the reduction of the characteristics of optical signals transmitted through the related connecting part can be prevented.

The present disclosure relates to subject matter contained in Japanese Patent Application No. 2000-111933, filed on Apr. 7, 2000, the disclosure of which is expressly incorporated herein by reference in its entirety.

What is claimed is:

1. A receptacle module comprising:
a receptacle having first and second sleeves formed at positions facing each other in an axial direction by way of a window and
an optical module provided with at least one of a light receiving element and/or a light emitting element and a first optical fiber and having a projection for insertion through said window and a body for insertion into said second sleeve, the first optical fiber being exposed at an end face of said projection, wherein
a length of said projection is formed to be substantially at least a length of said window in the axial direction,
the end face of the projection positioned at an end face of said window at said first sleeve side or is positioned inside said first sleeve when the body of said optical module is fully inserted into said second sleeve, and
said first sleeve receives an optical fiber connector having an end face at which a second optical fiber is exposed for optical connection with said first optical fiber.

2. A receptacle module as set forth in claim 1, wherein the surface of the first optical fiber exposed at the end face of the projection of the optical module is polished so as to connect with said second optical fiber by physical contact.

3. A receptacle module as set forth in claim 1 or 2, wherein a connection load of at least 1.09 times the standard value of the connection load when optically connect two optical fiber connectors is applied to a connecting part of said first optical fiber and said second optical fiber when the optical fiber connector is inserted in said first sleeve.

4. A receptacle module as set forth in claim 3, wherein a connection load of at least 8.5N is applied.

5. A receptacle module as set forth in claim 1, wherein the optical fiber connector is one having a ferrule through which said second optical fiber passes and is exposed at its end face, a housing holding said ferrule to be able to move in the axial direction, and a spring for pushing said ferrule in said housing toward the inside of the first sleeve.

6. A receptacle module as set forth in claim 5, wherein said optical fiber connector is selected from MT-RJ, MPO, SC, FC and MPX connectors.

7. A receptacle module as set forth in claim 6, wherein the ferrule of the optical fiber connector is moved at least 0.5 mm at the end face of the projection of the optical module when said optical fiber connector is inserted in the first sleeve.

8. An optical fiber connection assembly comprising:
a receptacle having first and second sleeves formed at positions facing each other in an axial direction by way of a window;
an optical module provided with at least one of a light receiving element and/or a light emitting element and a first optical fiber and having a projection for insertion through said window and a body for insertion into said second sleeve, the first optical fiber being exposed at an end face of said projection; and
an optical fiber connector having a ferrule through which a second optical fiber cable passes and is exposed at its end face, a housing holding said ferrule to be able to move in the axial direction, and a spring for pushing said ferrule in said housing toward the inside of the first sleeve; wherein a length of said projection is formed to be substantially at least a length of said window in the axial direction;

the end face of the projection positioned at an end face of said window at said first sleeve side or is positioned inside said first sleeve when the body of said optical module is fully inserted into said second sleeve; and the end faces of said first optical fiber and said second optical fiber are optically connected by a connection load of at least 1.09 times the standard value of the connection load when optically connect two optical fiber connectors when the optical fiber connector is inserted in said first sleeve.

9. An optical fiber connection assembly as set forth in claim 8, wherein a connection load of at least 8.5N is applied.

10. An optical fiber connection assembly as set forth in claim 8, wherein said optical fiber connector is selected from MT-RJ, MPO, SC, FC and MPX connectors.

11. An optical fiber connection assembly as set forth in claim 10, wherein the ferrule of the optical fiber connector is moved at least 0.5 mm at the end face of the projection of the optical module when said optical fiber connector is inserted in the first sleeve.

\* \* \* \* \*